United States Patent
Orji et al.

(10) Patent No.: US 10,444,386 B2
(45) Date of Patent: Oct. 15, 2019

(54) METHODS AND SYSTEMS THAT DETERMINE A VELOCITY WAVEFIELD FROM A MEASURED PRESSURE WAVEFIELD

(71) Applicant: PGS Geophysical AS, Oslo (NO)

(72) Inventors: Okwudili Chuks Orji, Oslo (NO); Endrias Getachew Asgedom, Oslo (NO); Walter Söllner, Oslo (NO)

(73) Assignee: PGS Geophysical AS, Oslo (NO)

( * ) Notice: Subject to any disclaimer, the term of this patent is extended or adjusted under 35 U.S.C. 154(b) by 1140 days.

(21) Appl. No.: 14/715,035

(22) Filed: May 18, 2015

(65) Prior Publication Data

US 2016/0061973 A1    Mar. 3, 2016

Related U.S. Application Data

(60) Provisional application No. 62/043,915, filed on Aug. 29, 2014.

(51) Int. Cl.
*G01V 1/28* (2006.01)
*G01V 1/30* (2006.01)
(Continued)

(52) U.S. Cl.
CPC .............. *G01V 1/28* (2013.01); *G01V 1/282* (2013.01); *G01V 1/30* (2013.01); *G01V 1/301* (2013.01);
(Continued)

(58) Field of Classification Search
CPC ... G01V 1/39; G01V 1/28; G01V 1/30; G01V 2210/40; G01V 2210/44; G01V 2210/51;
(Continued)

(56) References Cited

U.S. PATENT DOCUMENTS 5,193,077 A * 3/1993 Weiglein ................ G01H 3/005
181/112
5,754,492 A   5/1998 Starr
(Continued)

FOREIGN PATENT DOCUMENTS

EP    2 669 713 A3    8/2015
GB    2527406 A      12/2015

OTHER PUBLICATIONS

D.J. Verschuur "Adaptive surface-related multiple elimination", Geophysics, vol. 57, No. 9 (Sep. 1992), p. 1166-1177.*
(Continued)

*Primary Examiner* — Regis J Betsch
*Assistant Examiner* — Kaleria Knox

(57) ABSTRACT

Methods and systems that compute an approximate vertical-velocity wavefield based on a measured pressure wavefield and knowledge of the free-surface shape when the pressure wavefield was measured are described. The measured pressure wavefield is used to compute an approximate frozen free-surface profile of the free surface. The approximate frozen free-surface profile and the measured pressure wavefield are then used to compute an approximate vertical-velocity wavefield that does not include low-frequency streamer vibrational noise. The approximate vertical-velocity wavefield and measured pressure wavefield may be used to separate the pressure wavefield into up-going and down-going pressure wavefields.

29 Claims, 29 Drawing Sheets

(51) Int. Cl.
*G01V 1/32* (2006.01)
*G01V 1/38* (2006.01)
*G01V 1/36* (2006.01)

(52) U.S. Cl.
CPC ............... *G01V 1/32* (2013.01); *G01V 1/36* (2013.01); *G01V 1/38* (2013.01); *G01V 2210/40* (2013.01); *G01V 2210/44* (2013.01); *G01V 2210/51* (2013.01); *G01V 2210/56* (2013.01); *G01V 2210/64* (2013.01); *G01V 2210/675* (2013.01)

(58) Field of Classification Search
CPC ........... G01V 2210/56; G01V 2210/64; G01V 2210/675; G01H 3/005
USPC .............................................. 181/112; 367/24
See application file for complete search history.

(56) References Cited

U.S. PATENT DOCUMENTS

| | | | |
|---|---|---|---|
| 5,774,416 A | 6/1998 | Sadek et al. | |
| 5,825,716 A | 10/1998 | Starr | |
| 6,654,693 B2 | 11/2003 | Sen et al. | |
| 6,894,948 B2 | 5/2005 | Brittan et al. | |
| 7,239,577 B2 | 7/2007 | Tenghamn et al. | |
| 7,286,690 B2 | 10/2007 | Kelly | |
| 7,359,283 B2 | 4/2008 | Vaage et al. | |
| 7,675,812 B2 | 3/2010 | Ferris | |
| 7,684,281 B2 | 3/2010 | Vaage et al. | |
| 7,835,225 B2 | 11/2010 | Sollner et al. | |
| 7,872,942 B2 | 1/2011 | Sollner | |
| 7,929,373 B2 | 4/2011 | Barr, Jr. | |
| 8,089,825 B2 | 1/2012 | Barr, Jr. et al. | |
| 8,427,901 B2 | 4/2013 | Lunde et al. | |
| 8,553,490 B2 | 10/2013 | Hillesund et al. | |
| 8,811,115 B2 | 8/2014 | Cambois | |
| 2010/0027375 A1 | 2/2010 | Barr, Jr. | |
| 2010/0091610 A1* | 4/2010 | Sollner | G01V 1/38 367/24 |
| 2014/0016436 A1 | 1/2014 | Sollner et al. | |
| 2015/0063064 A1 | 3/2015 | van Groenestjin | |

OTHER PUBLICATIONS

Endrias G. Asgedom "Pressure Normal Derivative Extraction for Arbitrarly Shaped Surfaces" pp. 4243-4247.*
Search Report, Application No. GB1515316.6, dated Jan. 19, 2016.
Holford, R.L., Scattering of sound waves at a periodic, pressure-release surface: An exact solution, J. Acoust. Soc. Am. 70(4), Oct. 1981, 1981 Acoustical Society of America, pp. 1116-1128.
Thorsos, Eric I., "The validity of the Kirchhoff approximation for rough surface scattering using a Gaussian roughness spectrum", J. Acoust. Soc. Am 83(1), Jan. 1988, 1988 Acoustical Society of America, pp. 78-92.
Amundsen, Lasse, et al., "Extraction of the normal component of the particle velocity from marine pressure data", Geophysics, vol. 60, No. 1 (Jan.-Feb. 1995); pp. 212-222.
Orji, Okwudili C., et al., "Imaging time varying sea surface using dual sensor data", 2011 SEG, SEG San Antonio 2011 Annual Meeting, pp. 3388-3392.
Orji, Okwudili, et al., "Effects of time-varying sea surface in marine seismic data", Geophysics, Sep. 27, 2011, pp. 1-46.
Asgedom, Endrias G., et al., "Pressure Normal Derivative Extraction for Arbitrarly Shaped Surfaces", 2014 SEG, SEG Denver 2014 Annual Meeting, pp. 4243-4247.

* cited by examiner

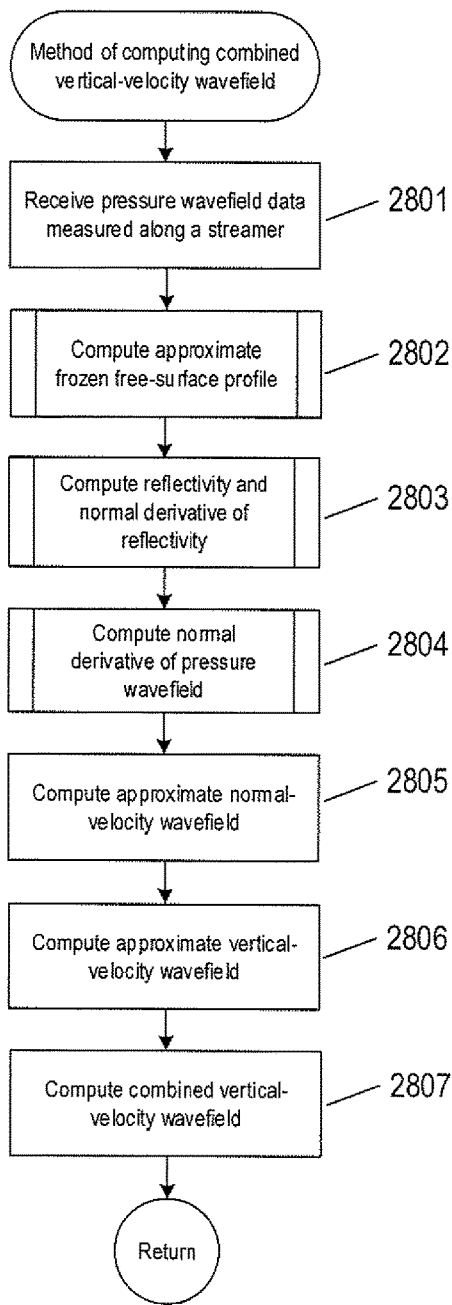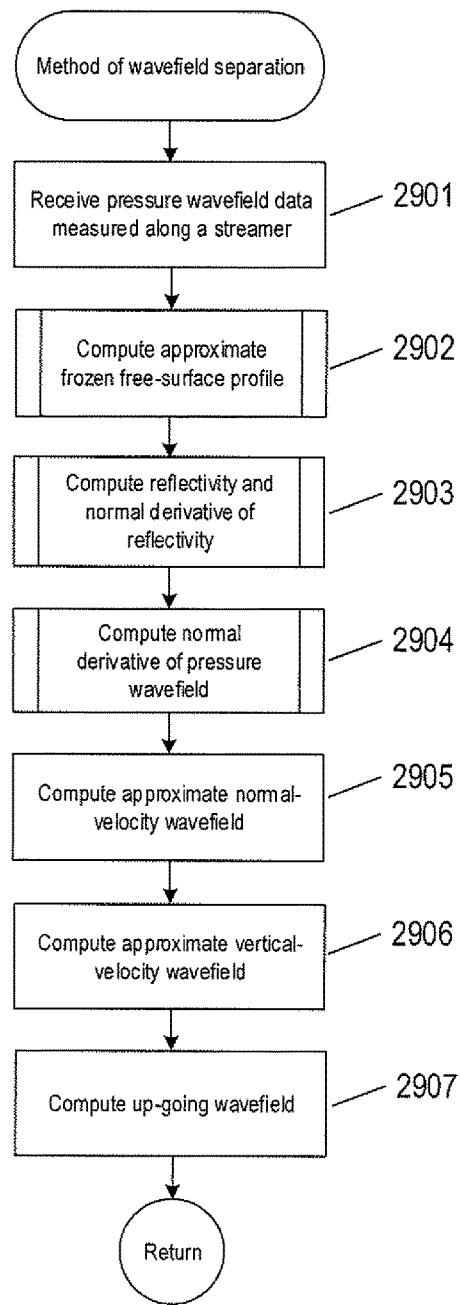
FIG. 28
FIG. 29

METHODS AND SYSTEMS THAT DETERMINE A VELOCITY WAVEFIELD FROM A MEASURED PRESSURE WAVEFIELD

CROSS-REFERENCE TO A RELATED APPLICATION

This application claims the benefit of Provisional Application 62/043915, filed Aug. 29, 2014.

BACKGROUND

In recent years, the petroleum industry has invested heavily in the development of improved marine survey techniques and seismic data processing methods in order to increase the resolution and accuracy of seismic images of subterranean formations. Marine surveys illuminate a subterranean formation located beneath a body of water with acoustic signals produced by one or more submerged seismic sources. The acoustic signals travel down through the water and into the subterranean formation. At interfaces between different types of rock or sediment of the subterranean formation a portion of the acoustic signal energy may be refracted, a portion may be transmitted, and a portion may be reflected back toward the formation surface and into the body of water. A typical marine survey is carried out with a survey vessel that passes over the illuminated subterranean formation while towing elongated cable-like structures called streamers. The streamers may be equipped with a number of collocated, dual pressure and particle motion sensors that detect pressure and particle motion wavefields, respectively, associated with the acoustic signals reflected back into the water from the subterranean formation. The pressure sensors generate pressure data that represents the pressure wavefield and the particle motion sensors generate particle motion data that represents the particle motion wavefield. The survey vessel receives and records the seismic data generated by the sensors.

A wavefield that propagates upward from the subterranean formation and is detected by the pressure or particle motion sensors is called an up-going wavefield. Ideally, a pressure or particle motion up-going wavefield alone may be used to compute a seismic image of the subterranean formation. However, the surface of the water acts as a nearly perfect acoustic reflector. As a result, the sensors also detect a down-going wavefield created by reflection of the up-going wavefield from the water surface. The down-going wavefield is essentially the up-going wavefield with a time delay that corresponds to the amount of time it takes for acoustic signals to travel up past the streamers to the water surface and back down to the streamers. The down-going wavefield creates "ghost" effects in seismic images of the subterranean formation. Typical seismic data processing techniques use both the pressure wavefield and particle motion wavefield to capture the up-going pressure and particle motion wavefields. However, the particle motion sensor may also record low-frequency noise, such as low-frequency noise created by streamer vibrations, that contaminates seismic images produced from the up-going wavefields. Those working in the field of marine exploration seismology continue to seek methods and systems that improve seismic image quality.

DESCRIPTION OF THE DRAWINGS

FIG. 28 shows a flow diagram of a method of computing a combined vertical velocity wavefield.

FIG. 29 shows a flow diagram of a method of wavefield separation.

DETAILED DESCRIPTION

Methods and systems that compute an approximate velocity wavefield based on a measured pressure wavefield and knowledge of the free-surface profile when the pressure wavefield was measured are described. The measured pressure wavefield is composed of pressure data generated by pressure sensors of one or more streamers. The measured pressure wavefield is used to compute an approximate frozen free-surface profile of the free surface. A frozen free-surface profile represents the frozen-in-time profile or shape of the free surface above the streamers at the time the pressure wavefield was measured. The approximate frozen free-surface profile and the measured pressure wavefield may be used to compute an approximate vertical-velocity wavefield which does not include low-frequency noise typically measured by particle motion sensor. The approximate vertical-velocity wavefield and measured pressure wavefield may also be used to separate the pressure wavefield into up-going and down-going pressure wavefields. The up-going pressure wavefield may, in turn, be used to compute seismic images with significantly higher resolution and deeper signal penetration than seismic images produced from seismic data contaminated with the down-going wavefield and low-frequency noise. High resolution seismic images may improve the accuracy of identifying hydrocarbon reservoirs and monitoring production of hydrocarbon reservoirs. In other words, typical wavefield separation is performed with measured pressure and vertical-velocity wavefields measured by collocated pressure and particle motion sensors. But methods and systems described herein eliminate the need for particle motion sensors and a measured vertical-velocity wavefield, because an approximate vertical-velocity wavefield may be obtained from the measured pressure wavefield alone, and wavefield separation may be performed with the measured pressure wavefield and the approximate vertical-velocity wavefield.

Figure 1A:
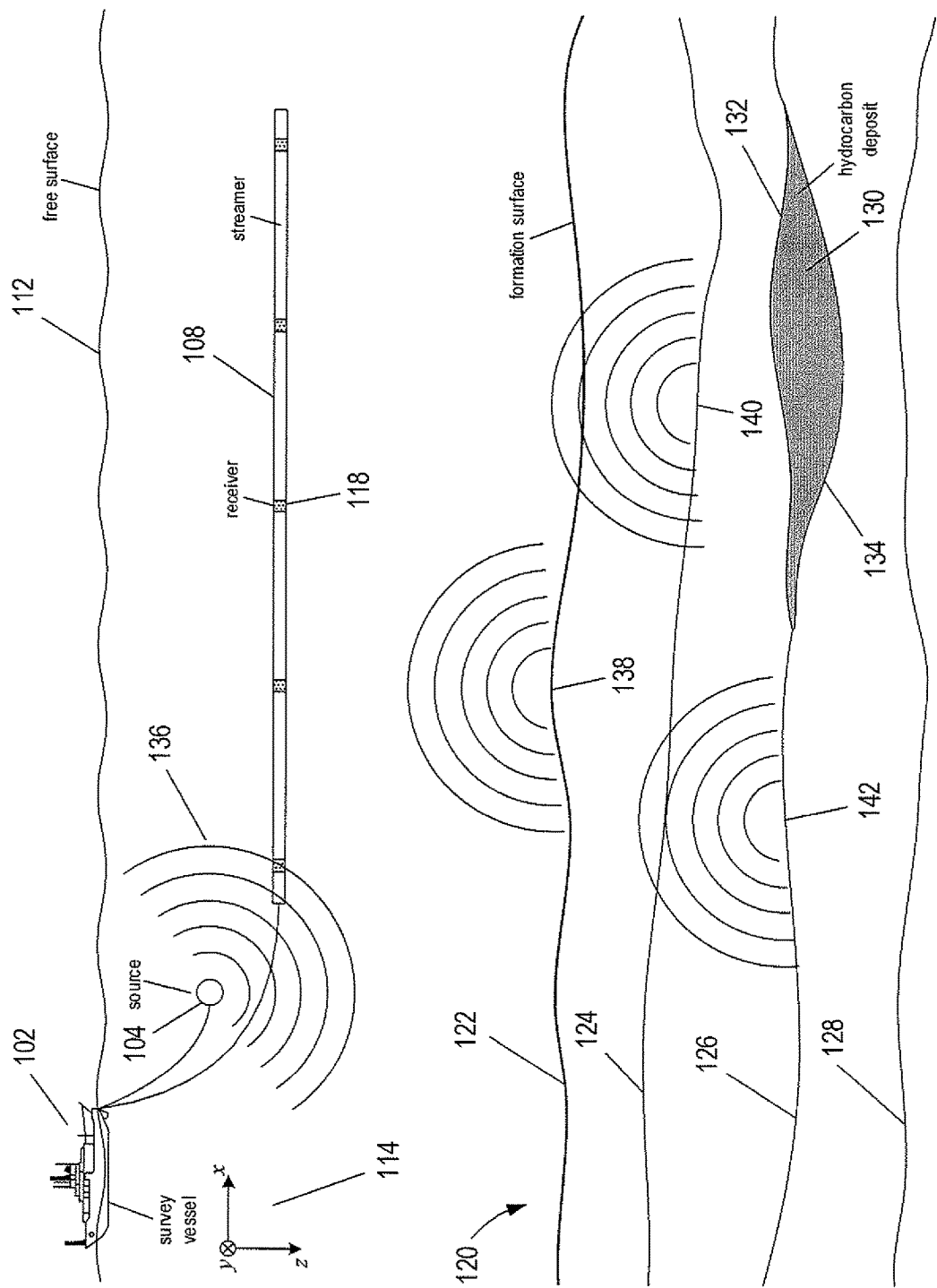
FIGS. 1A-1B show side-elevation and top views, respectively, of an example seismic data acquisition system.
Figure 1B:
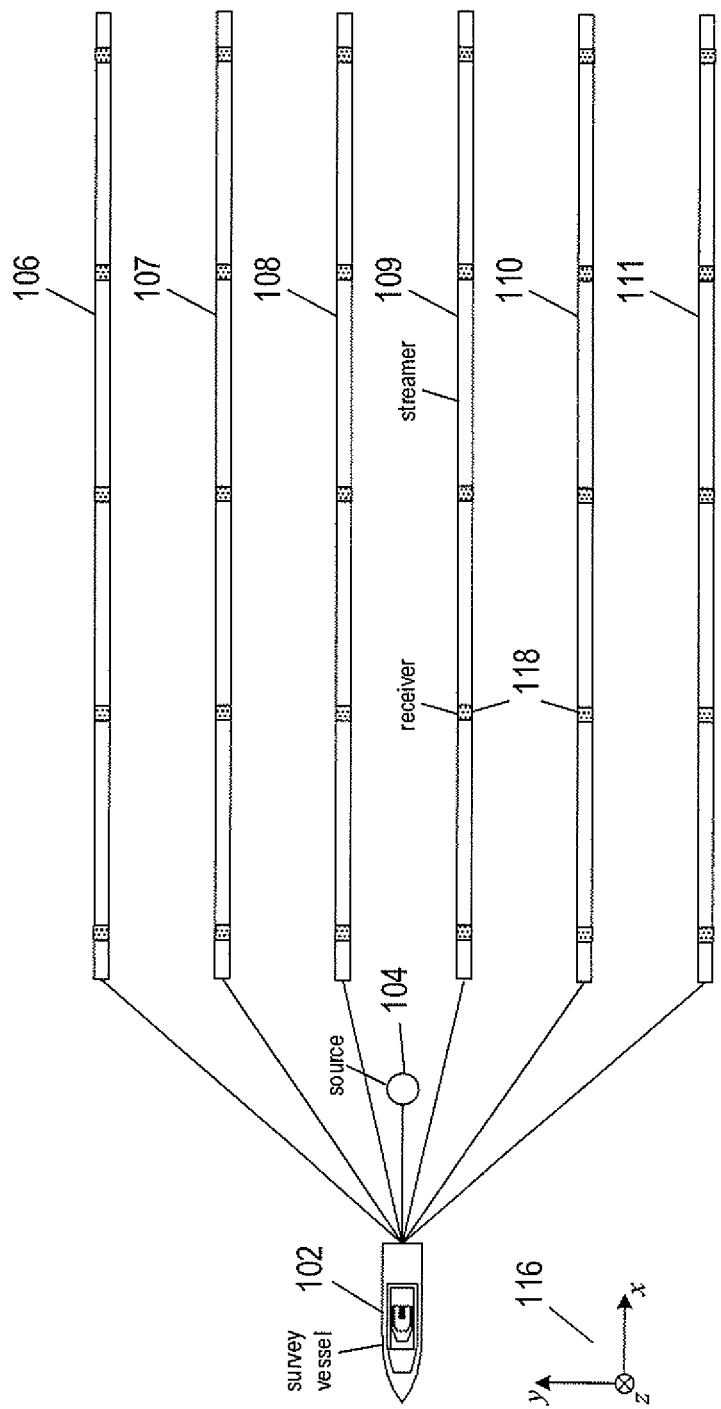

FIGS. 1A-1B show side-elevation and top views, respectively, of an example seismic data acquisition system composed of a survey vessel 102 towing a source 104 and six separate streamers 106-111 beneath a free surface 112 of a body of water. The body of water can be, for example, an ocean, a sea, a lake, or a river, or any portion thereof. In this example, each streamer is attached at one end to the survey vessel 102 via a streamer-data-transmission cable. The illustrated streamers 106-111 form a planar horizontal data acquisition surface with respect to the free surface 112. However, in practice, the data acquisition surface may be smoothly varying due to active sea currents and weather conditions. In other words, although the streamers 106-111 are illustrated in FIGS. 1A and 1B and subsequent figures as straight and substantially parallel to the free surface 112, in practice, the towed streamers may undulate as a result of dynamic conditions of the body of water in which the streamers are submerged. A data acquisition surface is not limited to having a planar horizontal orientation with respect to the free surface 112. The streamers may be towed at depths that angle the data acquisition surface with respect to the free surface 112 or one or more of the streamers may be towed at different depths. A data acquisition surface is not limited to six streamers as shown in FIG. 1B. In practice, the number of streamers used to form a data acquisition surface can range from as few as one streamer to as many as 20 or more streamers. It should also be noted that the number of sources is not limited to a single source. In practice, the number of sources selected to generate acoustic energy may range from as few as one source to three or more sources and the sources may be towed in groups by one or more vessels.

FIG. 1A includes an xz-plane 114 and FIG. 1B includes an xy-plane 116 of the same Cartesian coordinate system having three orthogonal, spatial coordinate axes labeled x, y and z. The coordinate system is used to specify orientations and coordinate locations within the body of water. The x-direction specifies the position of a point in a direction parallel to the length of the streamers (or a specified portion thereof when the length of the streamers are curved) and is referred to as the "in-line" direction. The y-direction specifies the position of a point in a direction perpendicular to the x-axis and substantially parallel to the free surface 112 and is referred to as the "cross-line" direction. The z-direction specifies the position of a point perpendicular to the xy-plane (i.e., substantially perpendicular to the free surface 112) with the positive z-direction pointing downward away from the free surface 112. The streamers 106-111 are long cables containing power and data-transmission lines that connect receivers represented by shaded rectangles, such as receiver 118, spaced-apart along the length of each streamer to seismic data acquisition equipment and data-storage devices located on board the survey vessel 102.

Streamer depth below the free surface 112 can be estimated at various locations along the streamers using depth-measuring devices attached to the streamers. For example, the depth-measuring devices can measure hydrostatic pressure or utilize acoustic distance measurements. The depth-measuring devices can be integrated with depth controllers, such as paravanes or water kites that control and maintain the depth and position of the streamers (or portions thereof) as the streamers are towed through the body of water. The depth-measuring devices are typically placed at intervals (e.g., about 300 meter intervals in some implementations) along each streamer. Note that in other implementations buoys may be attached to the streamers and used to maintain the orientation and depth of the streamers below the free surface 112.

FIG. 1A shows a cross-sectional view of the survey vessel 102 towing the source 104 above a subterranean formation 120. Curve 122, the formation surface, represents a top surface of the subterranean formation 120 located at the bottom of the body of water. The subterranean formation 120 may be composed of a number of subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be determined, at least in part, by analysis of seismic data collected during a marine survey. As the survey vessel 102 moves over the subterranean formation 120, the source 104 may be activated to produce an acoustic signal at spatial and/or temporal intervals. Activation of the source 104 is often called as a "shot." In other implementations, the source 104 may be towed by one survey vessel and the streamers may be towed by a different survey vessel. The source 104 may be an air gun, marine vibrator, or composed of an array of air guns and/or marine vibrators. FIG. 1A illustrates an acoustic signal expanding outward from the source 104 as a pressure wavefield 136 represented by semicircles of increasing radius centered at the source 104. The outwardly expanding wavefronts from the sources may be three-dimensional (e.g., spherical) but are shown in vertical plane cross section in FIG. 1A. The outward and downward expanding portion of the pressure wavefield 136 is called the "primary wavefield," which eventually reaches the formation surface 122 of the subterranean formation 120, at which point the primary wavefield may be partially reflected from the formation surface 122 and partially refracted downward into the subterranean formation 120, becoming elastic waves within the subterranean formation 120. In other words, in the body of water, the acoustic signal is composed primarily of compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves may be partially reflected and partially refracted. As a result, each point of the formation surface 122 and each point of the interfaces 124, 126, and 128 may be considered a reflector that becomes a potential secondary point source from which acoustic and elastic wave energy, respectively, may emanate upward toward the receivers 118 in response to the acoustic signal generated by the source 104 and downward-propagating elastic waves generated from the pressure impulse. As shown in FIG. 1A, secondary waves of significant amplitude may be generally emitted from points on or close to the formation surface 122, such as point 138, and from points on or very close to interfaces in the subterranean formation 120, such as points 140 and 142.

The secondary waves may be generally emitted at different times within a range of times following the initial acoustic signal. A point on the formation surface 122, such as the point 138, may receive a pressure disturbance from the primary wavefield more quickly than a point within the subterranean formation 120, such as points 140 and 142. Similarly, a point on the formation surface 122 directly beneath the source 104 may receive the pressure disturbance sooner than a more distant-lying point on the formation surface 122. Thus, the times at which secondary and higher-order waves are emitted from various points within the subterranean formation 120 may be related to the distance, in three-dimensional space, of the points from the activated source.

Acoustic and elastic waves, however, may travel at different velocities within different materials as well as within the same material under different pressures. Therefore, the travel times of the primary wavefield and secondary wavefield emitted in response to the primary wavefield may be functions of distance from the source 104 as well as the materials and physical characteristics of the materials through which the wavefields travel. In addition, the secondary expanding wavefronts may be altered as the wavefronts cross interfaces and as the velocity of sound varies in the media are traversed by the wave. The superposition of waves emitted from within the subterranean formation 120 in response to the primary wavefield may be a generally complicated wavefield that includes information about the shapes, sizes, and material characteristics of the subterranean formation 120, including information about the shapes, sizes, and locations of the various reflecting features within the subterranean formation 120 of interest to exploration seismologists.

Figure 2:
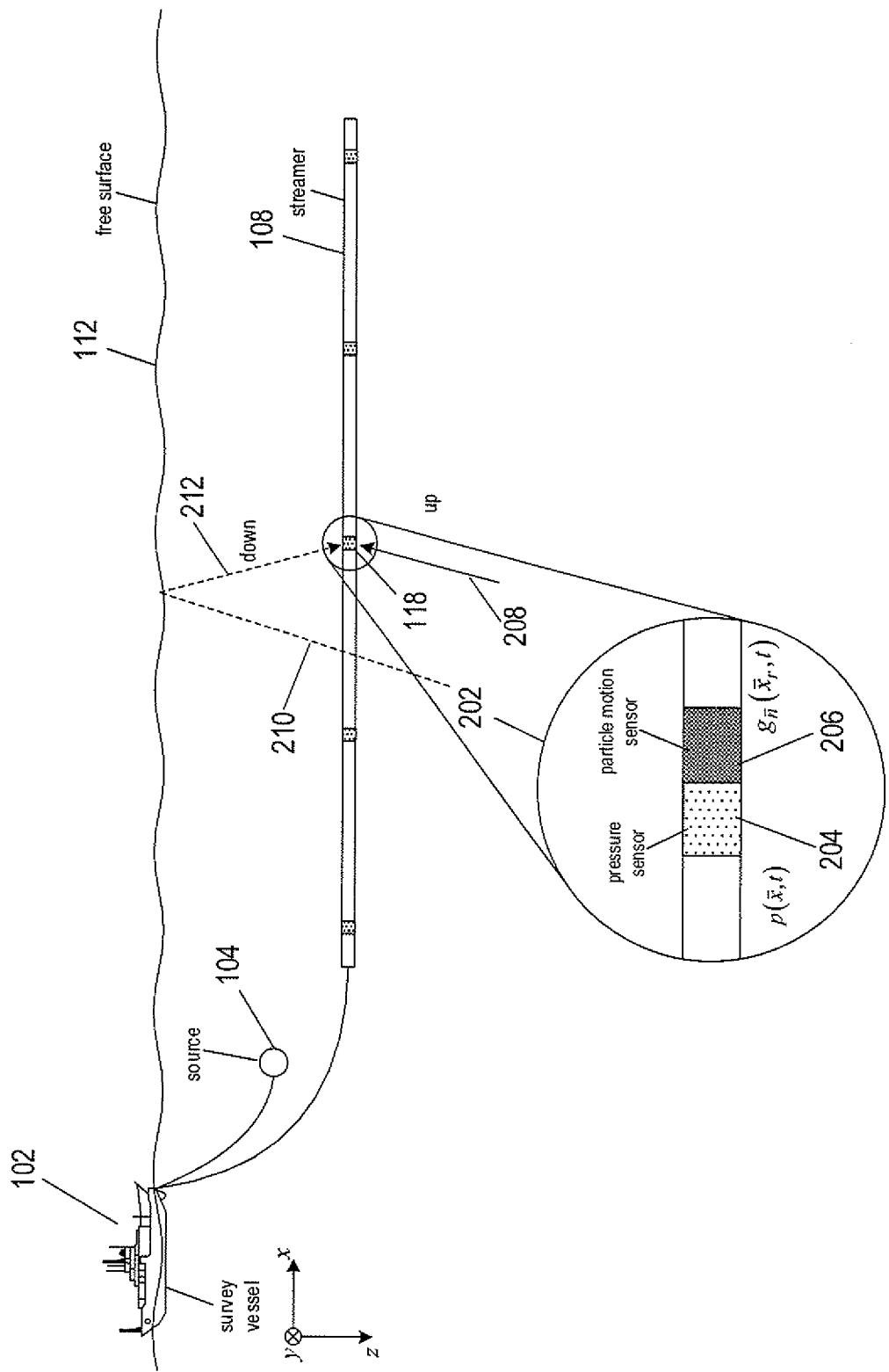
FIG. 2 shows a side-elevation view of a seismic data acquisition system with a magnified view of a receiver.

Each receiver 118 may be a multi-component sensor composed of one or more particle motion sensors that detect particle motion, velocities, or accelerations over time and a pressure sensor that detects variations in water pressure over time. FIG. 2 shows a side-elevation view of the seismic data acquisition system with a magnified view 202 of the receiver 118. In this example, the magnified view 202 reveals that the receiver 118 is a multi-component sensor composed of a pressure sensor 204 and a particle motion sensor 206. The pressure sensor may be, for example, a hydrophone. Each pressure sensor may measure changes in water pressure over time to produce pressure data denoted by $p(\vec{x}_r, t)$, where $\vec{x}_r$ represents the Cartesian receiver coordinates $(x_r, y_r, z_r)$ of a receiver, subscript r is a receiver index, and t represents time. The particle motion sensors may be responsive to water motion. In general, particle motion sensors detect particle motion in a direction normal to the orientation of the particle motion sensor and may be responsive to such directional displacement of the particles, velocity of the particles, or acceleration of the particles. A particle motion sensor that measures displacement generates displacement data denoted by $g_{\vec{n}}(\vec{x}_r, t)$. A particle motion sensor that measures particle velocity (i.e., particle velocity sensor) generates particle velocity data denoted by $v_{\vec{n}}(\vec{x}_r, t)$. A particle motion sensor that measures particle acceleration (i.e., accelerometer) generates particle acceleration data denoted by $a_{\vec{n}}(\vec{x}_r, t)$. The data generated by one type of particle motion sensor may be converted to another type during seismic data processing. For example, displacement data may be differentiated to obtain particle velocity data, and the particle acceleration data may be integrated to obtain particle velocity data.

The particle motion sensors are typically oriented so that the particle motion is measured in the vertical direction (i.e., $\vec{n}=(0, 0, z)$) in which case $v_z(\vec{x}_r, t)$ is called the vertical-velocity data and $a_z(\vec{x}_r, t)$ is called the vertical acceleration data. Alternatively, each receiver may include two additional particle motion sensors that measure particle motion in two other directions, $\vec{n}_1$ and $\vec{n}_2$, that are orthogonal to $\vec{n}$ (i.e., $\vec{n} \cdot \vec{n}_1 = \vec{n} \cdot \vec{n}_2 = 0$, where "·" is the scalar product) and orthogonal to one another (i.e., $\vec{n}_1 \cdot \vec{n}_2 = 0$). In other words, each receiver may include three particle motion sensors that measure particle motion in three orthogonal directions. For example, in addition to having a particle motion sensor that measures particle velocity in the z-direction to give $v_z(\vec{x}_r, t)$, each receiver may include a particle motion sensor that measures the wavefield in the in-line direction in order to obtain the inline velocity data, $v_x(\vec{x}_r, t)$, and a particle motion sensor that measures the wavefield in the cross-line direction in order to obtain the cross-line velocity data, $v_y(\vec{x}_r, t)$. In certain implementations, the particle motion sensors may be omitted and the receivers may be composed of only pressure sensors.

The streamers 106-111 and the survey vessel 102 may include sensing electronics and data-processing facilities that allow seismic data generated by each receiver to be correlated with the time the source 104 is activated, absolute positions on the free surface 112, and absolute three-dimensional positions with respect to an arbitrary three-dimensional coordinate system. The pressure data and particle motion data may be stored at the receiver, and/or may be sent along the streamers and data transmission cables to the survey vessel 102, where the data may be stored electronically or magnetically on data-storage devices located onboard the survey vessel 102. The pressure data and particle motion, velocity, or acceleration data represent pressure and particle motion wavefields, and therefore, may also be referred to as the measured pressure wavefield and measured particle motion, velocity, or acceleration wavefield, respectively.

Returning to FIG. 2, directional arrow 208 represents the direction of an up-going wavefield at the location of receiver 118 and dashed-line arrows 210 and 212 represent a down-going wavefield produced by reflection of an up-going wavefield from the free surface 112 before reaching the receiver 118. In other words, the pressure wavefield measured by the pressure sensors is composed of an up-going pressure wavefield component and a down-going pressure wavefield component, and the particle motion wavefield measured by the particle motion sensors is composed of an up-going wavefield component and a down-going wavefield component. The down-going wavefield, also called the "ghost wavefield," interferes with the pressure and particle motion data generated by the receivers and creates notches in the seismic data spectral domain as explained below with reference to FIGS. 6 and 7.

As explained above, each pressure sensor 204 and particle motion sensor 206 generates seismic data that may be stored in data-storage devices located at the receiver or onboard the survey vessel. Each pressure sensor and particle motion sensor may include an analog-to-digital converter that converts time-dependent analog signals into discrete time series that consist of a number of consecutively measured values called "amplitudes" separated in time by a sample rate. The time series generated by a pressure or particle motion sensor is called a "trace," which may consist of thousands of samples collected at a typical sample rate of about 1 to 5 ms. A trace is a recording of a subterranean formation response to acoustic energy that passes from an activated source into the subterranean formation where a portion of the acoustic energy is reflected and/or refracted and ultimately detected by a sensor as described above. A trace records variations in a time-dependent amplitude that represents acoustic energy in the portion of the secondary wavefield measured by the sensor. The coordinate location of each time sample generated by a moving sensor may be calculated from global position information obtained from one or more global positioning devices located along the streamers, survey vessel, and buoys and the known geometry and arrangement of the streamers and sensors. A trace generated by a pressure sensor or particle motion sensor is wavefield data that may be represented as a set of time-dependent amplitudes denoted by:

$$tr_r(t) = \{a_r(t_j)\}_{j=1}^{J} \qquad (1)$$

where
j is a time sample index;
J is the number of time samples; and
$a_r(t_j)$ is the pressure or particle motion amplitude at time sample For example, $p(\vec{x}_r, t)$ is the trace generated by a pressure sensor and $v_n(\vec{x}_r, t)$ is the trace generated by a particle motion sensor. Each trace may also include a trace header not represented in Equation (1) that identifies the specific receiver that generated the trace, receiver GPS coordinates, and may include time sample rate and the number of samples.

As explained above, the secondary wavefield typically arrives first at the receivers located closest to the sources. The distance from the sources to a receiver is called the "source-receiver offset," or simply "offset," which creates a delay in the arrival time of a secondary wavefield from an interface within the subterranean formation. A larger offset generally results in a longer arrival time delay. The traces are collected to form a "gather" that can be further processed using various seismic data processing techniques in order to obtain information about the structure of the subterranean formation.

Figure 3:
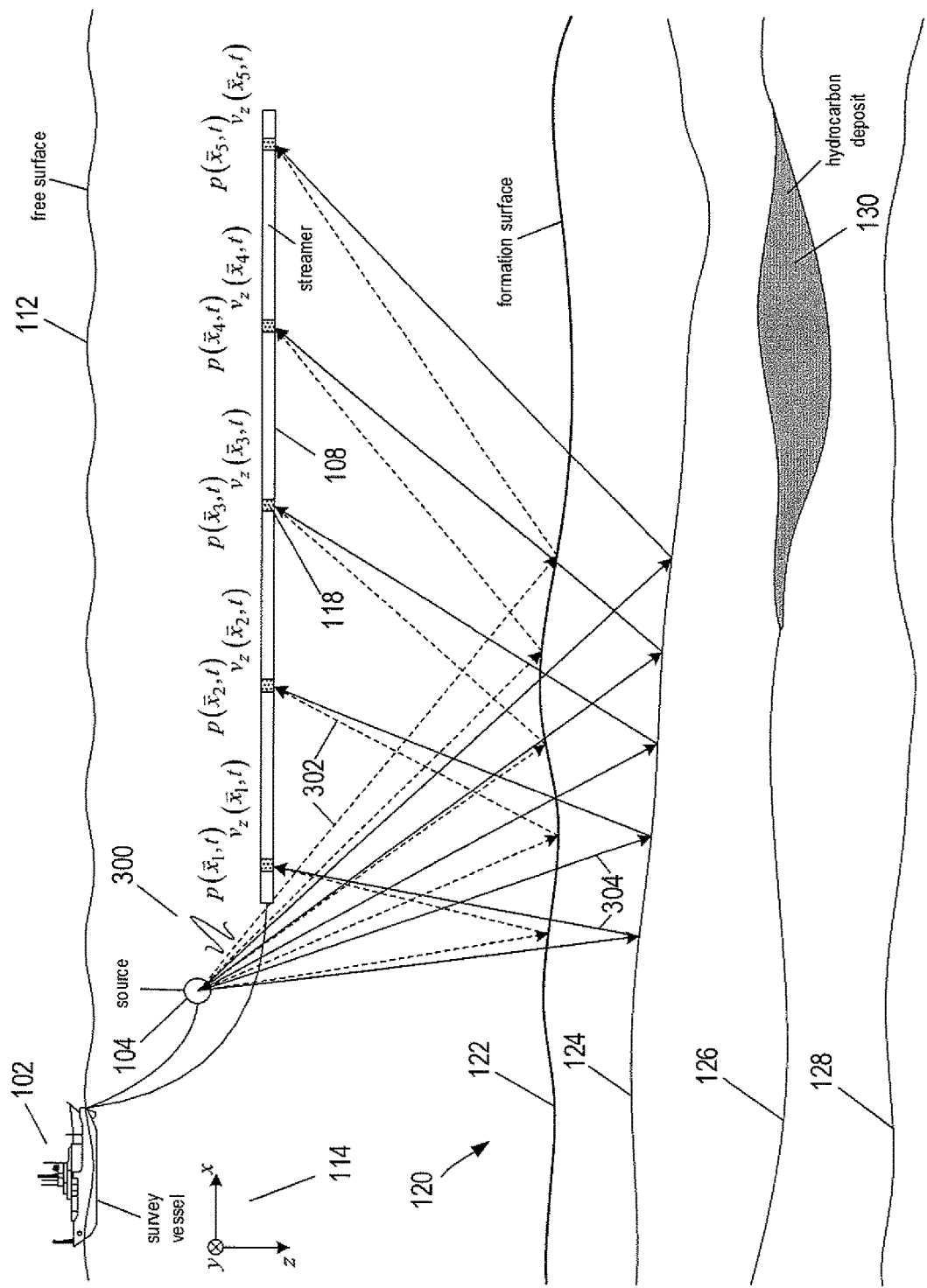
FIG. 3 shows example ray paths that represent paths of an acoustic signal that travels from a source into a subterranean formation.

FIG. 3 shows example ray paths of an acoustic signal 300 that travels from the first source 104 to or into the subterranean formation 120. Dashed-line rays, such as rays 302, represent acoustic energy generated by source 104 and reflected from the formation surface 122 to the receivers 118 located along the streamer 108, and solid-line rays, such as rays 304, represent acoustic energy generated by source 104 and reflected from the interface 124 to the receivers 118 located along the streamer 108. Note that for simplicity of illustration only a handful of ray paths are represented. Each pressure sensor may measure the pressure variation, and each particle motion sensor may measure the particle motion, velocity, or acceleration of the acoustic energy reflected from the subterranean formation 120 or interfaces therein. In the example of FIG. 3, the particle motion sensors located at each receiver 118 measure vertical-velocity of the wavefield emanating from the subterranean formation 120. The pressure data and/or particle motion data generated at each receiver 118 may be time sampled and recorded as separate traces represented by Equation (1). A collection of traces, called a "gather," provides a way of representing a measured wavefield. For example, pressure data generated by a number of pressure sensors represents a measured pressure wavefield and vertical-velocity generated by a number of particle motion sensors represents a measured vertical-velocity wavefield. In the example of FIG. 3, the collection of traces generated by the receivers 118 along the streamer 108 for a single activation of the source 104 may be collected to form a "common-shot gather." The traces generated by the receivers located along each of the other five streamers for the same activation may be collected to form separate common-shot gathers, each gather associated with one of the streamers.

Figure 4:
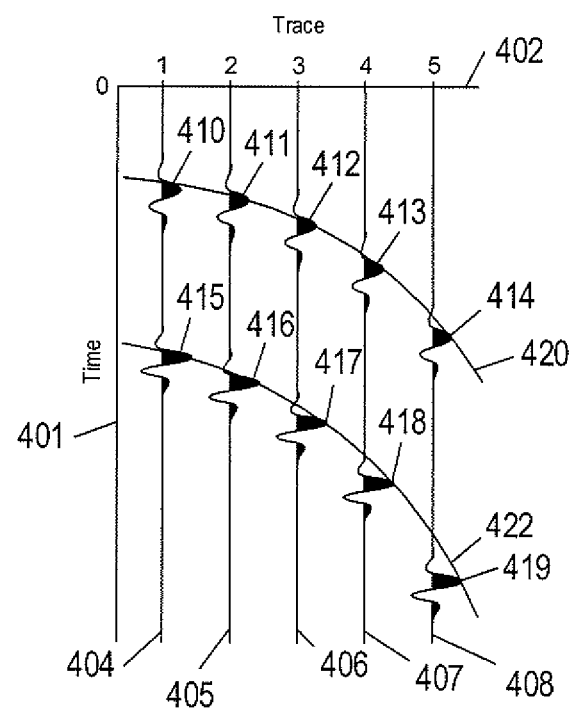
FIG. 4 shows a plot of a synthetic common-shot gather composed of example traces.

FIG. 4 shows a plot of a common-shot gather composed of example traces of the wavefield measured by the five receives located along the streamer 108 shown in FIG. 3. Vertical axis 401 represents time and horizontal axis 402 represents trace numbers with trace "1" representing the seismic data generated by the receiver 118 located closest to the source 104 and trace "5" representing the seismic data generated by the receiver 118 located farthest away from the source 104. The traces 404-408 may represent variation in the amplitude of either the pressure data or the particle motion data measured by corresponding sensors of the five receivers 118. The example traces include wavelets or pulses 410-419 that represent the up-going wavefield measured by the pressure sensors or particle motion sensors. Peaks, colored black, and troughs of each trace represent changes in the amplitude. The distances along the traces 404-408 from time zero to the wavelets 410-414 represent two-way travel time of the acoustic energy output from the source 104 to the formation surface 122 and to the receivers 118 located along the streamer 108, and wavelets 415-419 represents longer two-way travel time of the acoustic energy output from the source 104 to the interface 124 and to the same receivers 118 located along the streamer 108. The amplitude of the peak or trough of the wavelets 410-419 indicate the magnitude of the reflected acoustic energy recorded by the receivers 118.

The arrival times versus source-receiver offset is longer with increasing source-receiver offset. As a result, the wavelets generated by a formation surface or an interface are collectively called a "reflected wave" that tracks a hyperbolic curve. For example, hyperbolic curve 420 represents the hyperbolic distribution of the wavelets 410-414 reflected from the formation surface 122, which are called a "formation-surface reflected wave," and hyperbolic curve 422 represents the hyperbolic distribution of the wavelets 415-419 from the interface 124, which are called an "interface reflected wave."

Figure 5:
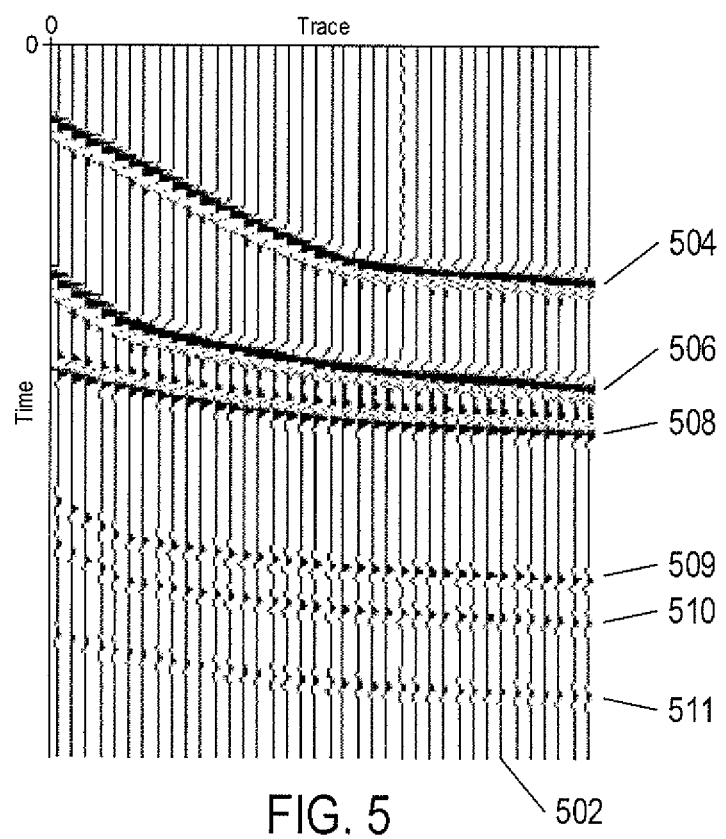
FIG. 5 shows an example expanded view of a synthetic common-receiver gather composed of 38 traces.

FIG. 5 shows an expanded view of a gather composed of 38 traces. Each trace, such as trace 502, varies in amplitude over time and represents acoustic energy reflected from a subterranean formation surface and five different interfaces within the subterranean formation as measured by a pressure sensor or a particle motion sensor. In the expanded view, wavelets that correspond to reflections from the formation surface or an interface within the subterranean formation appear chained together to form reflected waves. For example, wavelets 504 with the shortest transit time represent a formation-surface reflected wave, and wavelets 506 represent an interface reflected wave emanating from an interface just below the formation surface. Reflected waves 508-511 represent reflections from interfaces located deeper within the subterranean formation.

A gather is a collection of traces that represents the pressure or vertical-velocity wavefield measured by corresponding pressure sensors or particle motion sensors. The gather shown in FIG. 4 is sorted in a common-shot domain and the gather shown in FIG. 5 is sorted into a common-receiver domain. A domain is a collection of traces that share a common geometrical attribute with respect to the seismic data recording locations. The seismic data may be sorted into any suitable domain for examining the features of a subterranean formation including a common-receiver domain, a common-receiver-station domain, or a common-midpoint domain.

In practice, however, measured pressure and vertical-velocity wavefields do not share the same broad frequency spectrum. For example, pressure sensors typically have a high signal-to-noise ratio over a broad frequency range, but particle motion sensors often detect low-frequency, streamer vibrational motion that contaminates the low-frequency part of the vertical-velocity data. As a result, particle motion sensors may have a low signal-to-noise ratio over the low-frequency part of the frequency range.

Figure 6A:
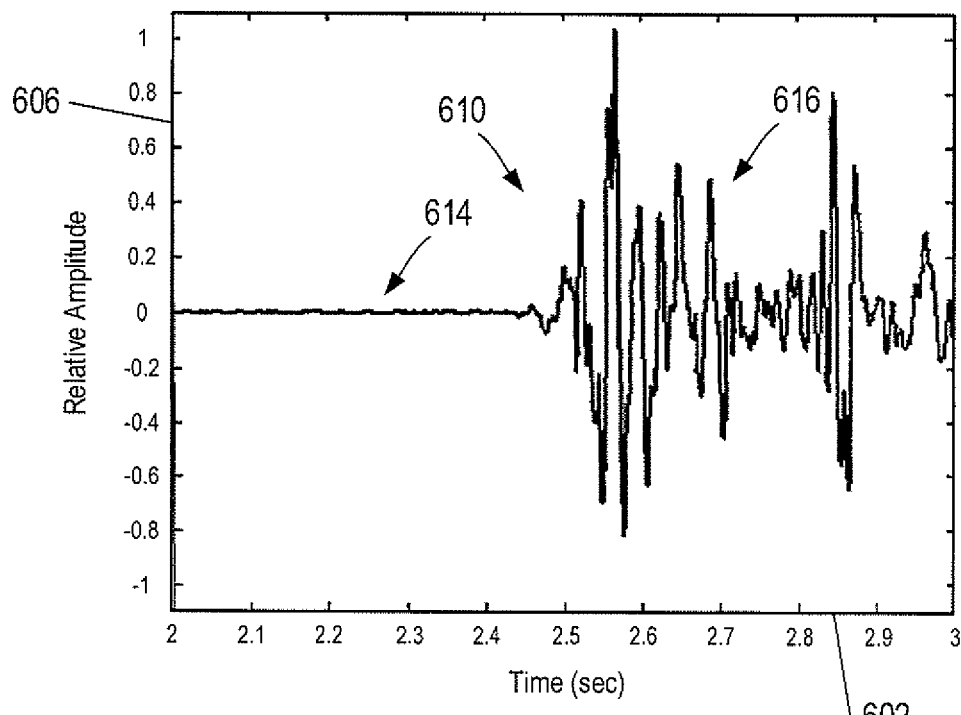
FIGS. 6A-6B show relative amplitude versus time plots of pressure data and vertical-velocity data generated by collocated pressure and particle motion sensors
Figure 6B:
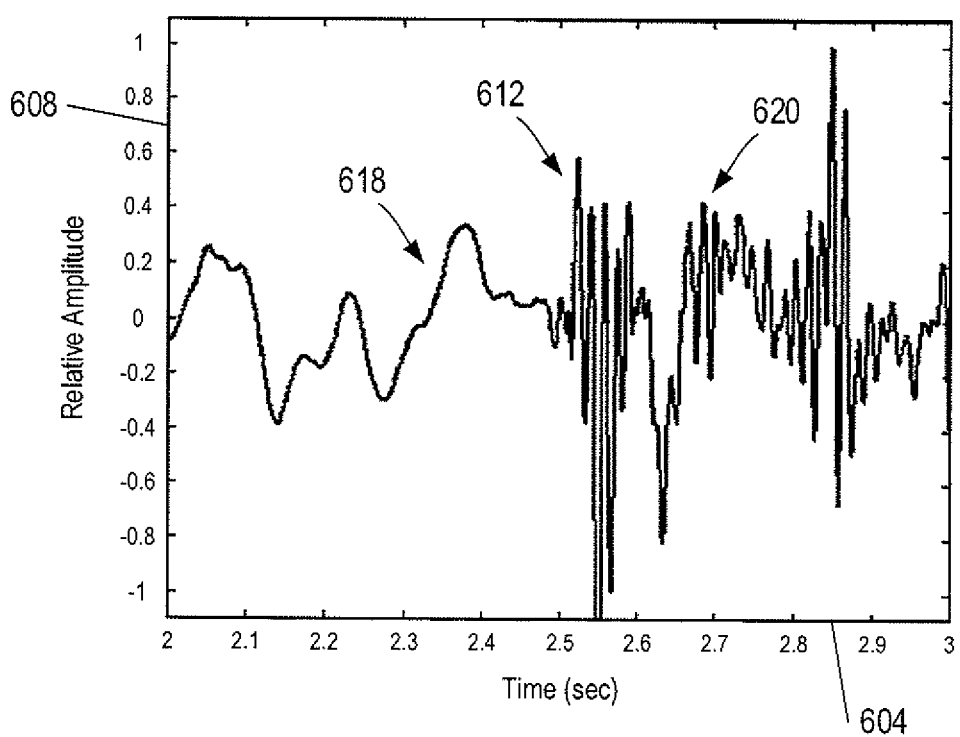

FIGS. 6A-6B show relative amplitude versus time plots of pressure data and vertical-velocity data, respectively, generated by collocated pressure and particle motion sensors located at a depth of about 13 meters below the free surface. Horizontal axes 602 and 604 represent the same time interval, and vertical axes 606 and 608 represent relative amplitude. In FIG. 6A, waveform 610 represents water pressure changes measured by the pressure sensor in response to an acoustic signal generated by a source. In FIG. 6B, waveform 612 represents the vertical-velocity changes in the water measured by the particle motion sensor in response to the same acoustic signal. The waveform 610 exhibits a flat region 614 (i.e., approximately zero amplitude variation) and a rapidly varying region 616 that begins at about 2.45 sec, which corresponds to water pressure changes resulting from the acoustic signal. By contrast, the waveform 612 exhibits a slowly varying region 618 that switches to a rapidly varying region 620 at about 2.45 sec. The slowly varying region 618 is the low-frequency particle motion that may include noise resulting from streamer vibrations detected by the particle motion sensor. The rapidly varying region 620 is the water particle motion resulting from the acoustic signal. The flat region 614 in FIG. 6A indicates that the pressure sensor does not detect the same streamer vibration.

Low-frequency noise (e.g., vibrational noise) may be observed in the frequency spectra of the vertical-velocity wavefield. The pressure data represented by each trace in the measured pressure wavefield may be transformed from the space-time ("s-t") domain to the space-frequency ("s-f") domain using a Fast Fourier Transform ("FFT") or a discrete Fourier transform ("DFT"):

$$p(\vec{x}_r, t) \xrightarrow{FT} P(\vec{x}_r, \omega) \quad (2)$$

where $\omega$ is the angular frequency.

Likewise, the vertical-velocity data represented by each trace in the vertical-velocity wavefield may be transformed from the s-t domain using an FFT or a DFT to the s-f domain:

$$v_z(\vec{x}_r, t) \xrightarrow{FT} V_z(\vec{x}_r, \omega) \quad (3)$$

Figure 7:
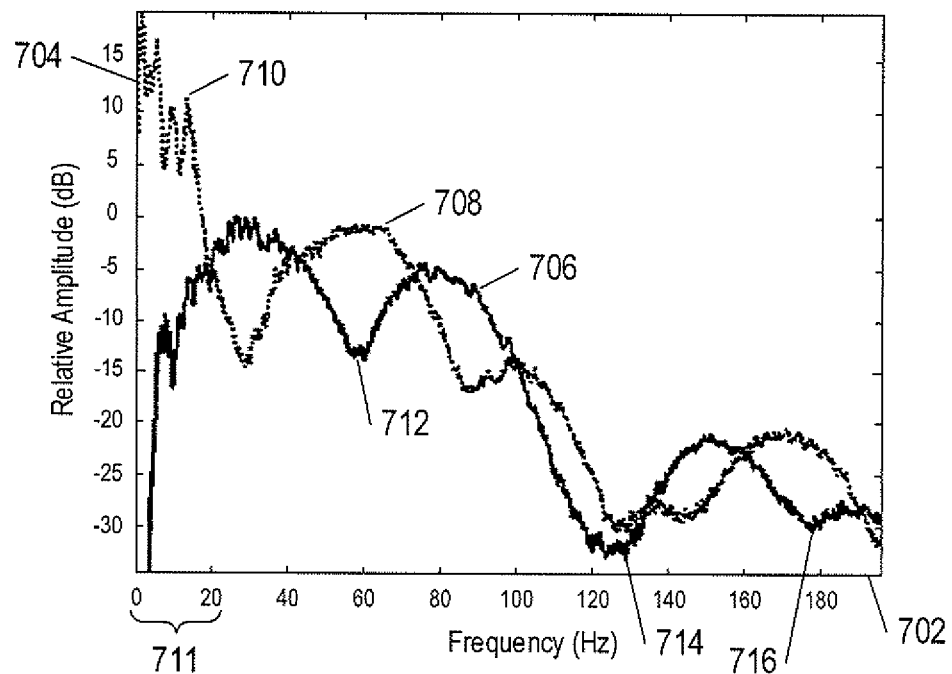
FIG. 7 shows frequency spectra for the pressure data and the vertical-velocity data shown in FIGS. 6A and 6B.

FIG. 7 shows frequency spectra for the pressure and vertical-velocity data shown in FIGS. 6A and 6B. Horizontal axis 702 represents a frequency domain, vertical axis 704 represents relative amplitude, solid curve 706 represents the frequency spectrum of the pressure data shown in FIG. 6A (i.e., the pressure spectrum), and dotted curve 708 represents the frequency spectrum of the vertical-velocity data shown in FIG. 6B. Low-frequency part 710 of the vertical-velocity spectrum corresponds to the slowly varying low-frequency noise measured by the vertical velocity sensors (i.e., the vertical-velocity spectrum). The large relative amplitude of the low-frequency part 710 results from the low-frequency streamer vibrations and the corresponding range of frequencies is called the "low-frequency range" 711, which, in this example, ranges from 0 to about 20 Hz. The pressure spectrum 706 and the vertical-velocity spectrum 708 above the low-frequency range 711 exhibit satisfactory signal-to-noise ratios.

Methods and systems described in greater detail below compute an approximate vertical-velocity wavefield from the measured pressure wavefield. In particular, the pressure data $p(\vec{x}_r, t)$ of each trace in the pressure wavefield is transformed from the s-t domain to wavenumber-frequency ("k-f") domain as follows:

$$p(\vec{x}_r, t) \xrightarrow{FT} P(k_x, k_y, \omega | z_r) \quad (4)$$

where $k_x$ is the x-direction or in-line wavenumber; and $k_y$ is the y-direction or cross-line wavenumber.

Methods and systems compute approximate vertical-velocity wavefield from the measured pressure wavefield in the k-f domain:

$$P(k_x, k_y, \omega | z_r) \rightarrow \tilde{V}_z(k_x, k_y, \omega | z_r) \quad (5)$$

where "~" represents approximate.

Approximate vertical-velocity data may replace the vertical-velocity data over the low-frequency range 711 provided (1) the pressure data has a satisfactory signal-to-noise ratio over the low-frequency range, (2) the pressure spectrum of the pressure data has no notches over the low-frequency range, and (3) the depth of the pressure sensors are known. As shown in FIG. 7, the relative amplitude of the pressure spectrum 706 exhibits notches 712, 714 and 716 that depend on the depth of the streamer. The notches 712, 714, and 716 are shifted toward lower frequencies as streamer depth increases and shifted toward higher frequencies as streamer depth decreases. For the example spectra shown in FIG. 7, the pressure spectrum 706 does not have notches in the low-frequency range 711, indicating that the pressure data over the low-frequency range may be used to calculate an estimated vertical-velocity wavefield over the low-frequency range 711.

In one implementation, the low-frequency part of the vertical-velocity data may be replaced by the approximate vertical-velocity data in the k-f domain using a combined vertical-velocity wavefield given by:

$$V_z^{combined}(k_x, k_y, \omega | z_r) = \tag{6}$$

$$\begin{cases} \tilde{V}_z(k_x, k_y, \omega | z_r) & \omega \leq \omega_n \\ W_L \tilde{V}_z(k_x, k_y, \omega | z_r) + W_H V_z(k_x, k_y, \omega | z_r) & \omega_n < \omega \leq \omega_c \\ V_z(k_x, k_y, \omega | z_r) & \omega_c < \omega \end{cases}$$

where
$\omega_n$ is an upper limit on the low-frequency range;
$\omega_c$ is the cutoff frequency; and
$W_L$ is a low-pass filter and $W_H$ is a high-pass filter that satisfy a condition $$W_L + W_H = 1 \tag{7}$$

The cutoff frequency $\omega_c$ is less than the lowest frequency notch in the pressure spectrum. For example, with reference to FIG. 7, the cutoff frequency should be less than about 60 Hz, which corresponds to the first notch 712. For $\omega_n < \omega \leq \omega_c$, the low- and high-pass filters may be frequency dependent:

$$W_L = \frac{\omega_c - \omega}{\omega_c - \omega_n} \tag{8a}$$

$$W_H = \frac{\omega - \omega_n}{\omega_c - \omega_n} \tag{8b}$$

Figure 8:
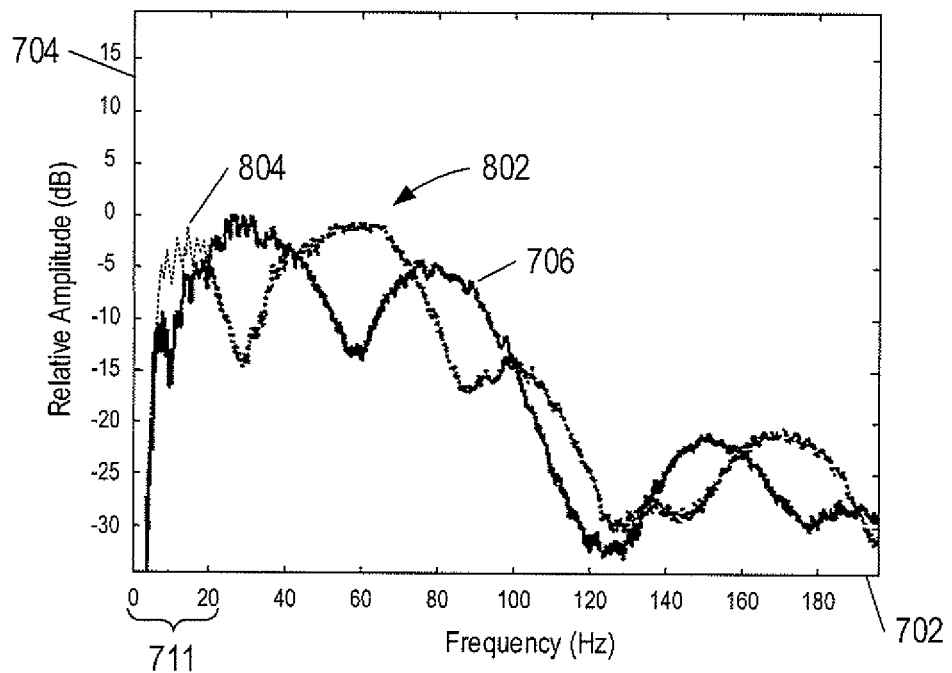
FIG. 8 shows the pressure spectrum and an example combined vertical velocity spectrum.

FIG. 8 shows the pressure spectrum 706 and an example combined vertical velocity spectrum 802. The combined vertical velocity spectrum 802 represents Equation (6) which is composed the vertical velocity spectrum 708 of FIG. 7 for frequencies greater than about 20 Hz and a synthetic estimated vertical velocity frequency spectrum 804 over the low-frequency range 711.

In another implementation in which recording of the vertical-velocity wavefield is omitted or the vertical-velocity wavefield is contaminated with noise over large portions of the frequency range, the approximate vertical-velocity wavefield may be computed over the full frequency range of the pressure data and used to substantially remove receiver ghost effects as follows. In the k-f domain, the pressure data may be represented as a sum of up-going pressure data and down-going pressure data as follows:

$$P(k_x, k_y, \omega | z_r) = P^{up}(k_x, k_y, \omega | z_r) + P^{down}(k_x, k_y, \omega | z_r) \tag{9}$$

where
$P^{up}(k_x, k_y, \omega | z_r)$ represents the up-going pressure data in the k-f domain; and $P^{down}(k_x, k_y, \omega | z_r)$ represents the down-going pressure data in the k-f domain.

The pressure data and approximate vertical-velocity wavefield may be used to separate the pressure data into up-going and down-going pressure data in the k-f domain as follows:

$$P^{up}(k_x, k_y, \omega | z_r) = \frac{1}{2}\left[P(k_x, k_y, \omega | z_r) - \frac{\rho\omega}{k_z}\tilde{V}_z(k_x, k_y, \omega | z_r)\right] \tag{10a}$$

$$P^{down}(k_x, k_y, \omega | z_r) = \frac{1}{2}\left[P(k_x, k_y, \omega | z_r) + \frac{\rho\omega}{k_z}\tilde{V}_z(k_x, k_y, \omega | z_r)\right] \tag{10b}$$

where
$\rho$ is the density of water; and $$k_z = \sqrt{\left(\frac{\omega}{c_0}\right)^2 - k_x^2 - k_y^2}$$

is the z-direction or vertical wavenumber with $c_0$ the speed of sound in water.

The separate up-going and down-going pressure data may be transformed from the k-f domain back to the s-t domain using an inverse FFT ("IFFT"), or inverse ("IDFT"), to obtain corresponding separate up-going and down-going pressure data in the s-t domain. The up-going wavefield may then be used to compute seismic images of the subterranean formation substantially free of the receiver ghost effects contained in the down-going pressure data.

Methods and systems compute an approximate velocity wavefield based on the measured pressure data and acoustic reflectivity of the free surface above the streamers when the pressure data is measured. In particular, methods and systems first compute the normal derivative of the pressure data at receiver locations along a streamer based on the measured pressure data and acoustic reflectivity of the free surface. The normal derivative may then be used to compute the normal derivative of the particle velocity at the same receiver locations along the streamer which, in turn, may be used to compute the vertical-velocity of the wavefield at the receiver locations along the streamer. Normal derivatives of the pressure data at receiver locations along the streamer are computed from a Green's second identity formulation of a source-free, closed surface that relates the pressure data measured at the receivers located along the streamer to the normal derivative of the measured pressure data and includes a Green's function representation of acoustic reflectivity from a spatiotemporally varying free surface above the streamer at the time the pressure data is measured.

Figure 9A:
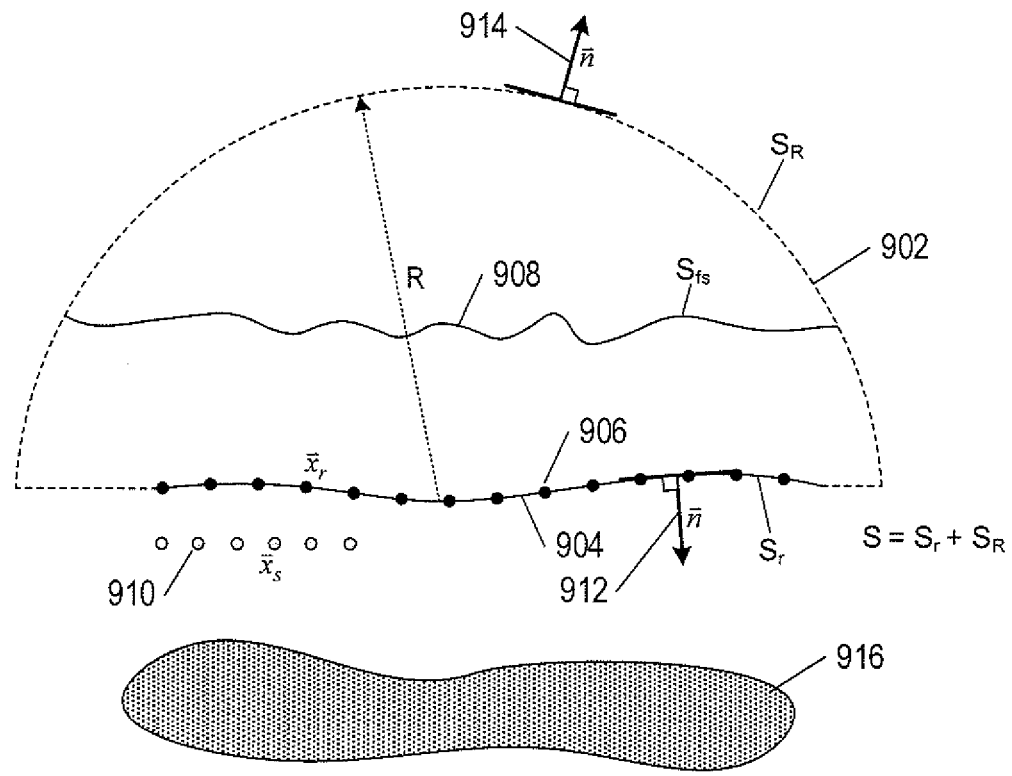
FIGS. 9A-9B show model geometries used to compute a normal derivative to measured pressure wavefield along a streamer.

FIG. 9A shows a model geometry for a streamer located below a free surface. In FIG. 9A, a closed surface S is composed of a hemispherical cap $S_R$ of radius R represented by a dashed-line curve 902 and a streamer $S_r$ represented by a curve 904 with solid dots, such as solid dot 906, that represent the locations of receivers spaced apart along the length of the streamer $S_r$. Curve 908 represents a profile of the free surface $S_{fs}$ located above the streamer $S_r$ and enclosed by closed surface S. Shaded circles, such as shaded circle 910, represent locations of sources. The coordinates of the receivers are denoted by $\vec{x}_r$, where the subscript r represents the r-th receiver of K total receivers located long the streamer, and the coordinates of the sources are denoted by $\vec{x}_s$, where the subscript s represents the s-th source of L total sources. Directional arrows 912 and 914 represent normal vectors, denoted by $\vec{n}$, directed orthogonal to the surface S. Shaded region 916 represents a subterranean formation. The shape of the streamer, locations of the receives and sources, and shape of the free surface shown in FIG. 9A represent an actual state of the streamer, receivers, sources, and free surface when the pressure data is measured by receivers located along the streamer $S_r$.

Figure 9B:
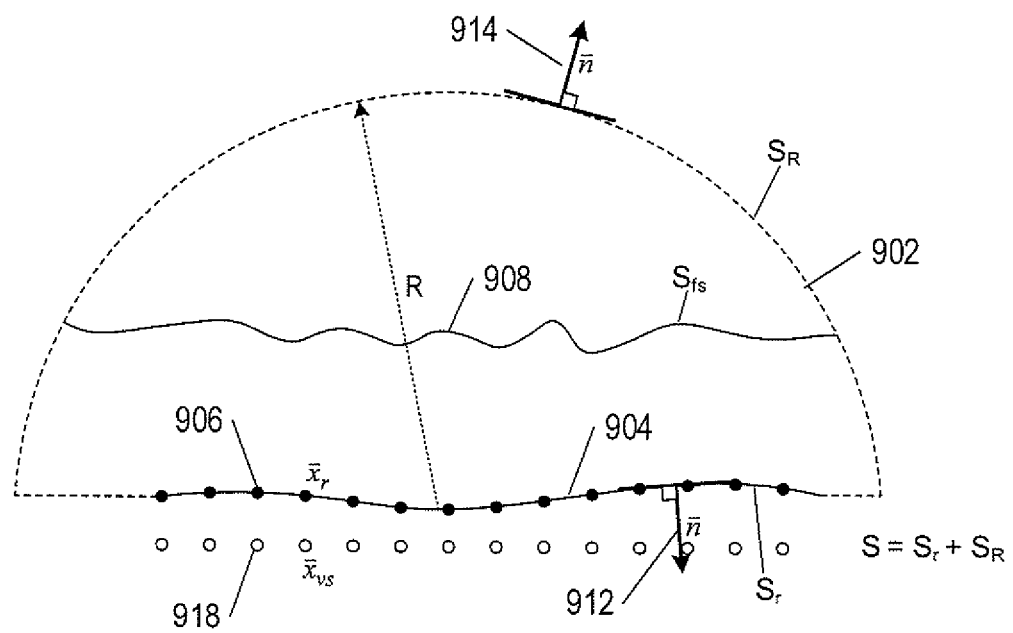

FIG. 9B shows a model geometry used to define a Green's function and its normal derivative based on the model geometry represented in FIG. 9A. The state represented in FIG. 9B includes the same free surface $S_{fs}$ enclosed by the closed surface S as shown in FIG. 9A. Green's function virtual sources are represented by circles, such as circle 918, with virtual source coordinates $\vec{x}_{vs}$. In the example of FIG. 9B, the virtual sources are located outside the volume enclosed by the closed surface S. Alternatively, the virtual sources may be located inside the volume enclosed by the closed surface S or on the closed surface S.

In order to relate the pressure wavefield to normal derivatives of the pressure wavefield at receiver locations along the streamer in the actual state shown in FIG. 9A, the two states represented in FIGS. 9A and 9B are coupled using Green's second identity as follows:

$$\int_V d\vec{x}[P(\vec{x}_r, \vec{x}_s, \omega)\nabla^2 G(\vec{x}_r, \vec{x}_{vs}, \omega) - G(\vec{x}_r, \vec{x}_{vs}, \omega)\nabla^2 P(\vec{x}_r, \vec{x}_s, \omega)] = \int_S dS\vec{n}\cdot[P(\vec{x}_r, \vec{x}_s, \omega)\nabla G(\vec{x}_r, \vec{x}_{vs}, \omega) - G(\vec{x}_r, \vec{x}_{vs}, \omega)\nabla P(\vec{x}_r, \vec{x}_s, \omega)] \quad (11)$$

where $P(\vec{x}_r, \vec{x}_s, \omega)$ represents the pressure data generated by a receiver at coordinate location $\vec{x}_r$ resulting from a source at coordinate location $\vec{x}_s$;

$G(\vec{x}_r, \vec{x}_{vs}, \omega)$ represents a Green's function at coordinate location $\vec{x}_r$ and virtual source coordinate location $\vec{x}_{vs}$; and V represents the volume of the space enclosed by the surface S.

The pressure data, $P(\vec{x}_r, \vec{x}_s, \omega)$, satisfies the Helmholtz wave equation given by $$\left(\nabla^2 + \frac{\omega^2}{c^2(\chi)}\right)P(\vec{x}|\vec{x}_s, \omega) = A(\omega)\delta(\vec{x} - \vec{x}_s) \quad (12a)$$

where $A(\omega)$ results from a Fourier transformation of a source-time function $a(t)$; and $c^2(\chi) = c_0^2(1-\alpha(\chi))$ with $c_0$ the speed of sound in water and $\alpha(\chi)$ the refractive index.

The Green's function, $G(\vec{x}_r, \vec{x}_{vs}, \omega)$, characterizes reflections from the free surface $S_{fs}$ and is a solution of the acoustic wave equation for a Dirac delta pulse represented by a Dirac delta function as follows:

$$\left(\nabla^2 + \frac{\omega^2}{c^2(\chi)}\right)G(\vec{x}|\vec{x}_{vs}, \omega) = \delta(\vec{x} - \vec{x}_{vs}) \quad (12b)$$

Utilizing the Sommerfeld radiation condition (i.e., $R \to \infty$) and substituting the Helmholtz wave Equation (12a) and the acoustic wave Equation (12b) into Equation (11), Equation (11) reduces to a surface integral equation over the surface of the streamer $S_r$ as follows:

$$\alpha P(\vec{x}, \omega) = \int_{S_r}\left[g(\vec{x}_r, \vec{x}_{vs}, \omega)\frac{\partial P(\vec{x}_r, \vec{x}_s, \omega)}{\partial n} - \frac{\partial G(\vec{x}_r, \vec{x}_{vs}, \omega)}{\partial n}P(\vec{x}_r, \vec{x}_s, \omega)\right]dS_r \quad (13)$$

where $$\frac{\partial}{\partial n} = \vec{n}\cdot\nabla$$

represents the normal derivative directed orthogonal to the streamer $S_r$; and $$\alpha = \begin{cases} 0 & \text{if } \vec{x}_{vs} \text{ is outside } S \\ \frac{1}{2} & \text{if } \vec{x}_{vs} \text{ is at } S \\ 1 & \text{if } \vec{x}_{vs} \text{ is inside } S \end{cases}.$$

The unit normal vector $\vec{n}$ in Equation (13) is given by $$\vec{n} = \frac{-\frac{\partial z(x,y)}{\partial x}\hat{i} - \frac{\partial z(x,y)}{\partial y}\hat{j} + \hat{k}}{\gamma}$$

where $$\gamma = \sqrt{1 + \left[\frac{dz(x,y)}{dx}\right]^2 + \left[\frac{dz(x,y)}{dy}\right]^2};$$

and $z(x, y)$ represents streamer depth.

The streamer depth $z(x, y)$ at points only along the streamer $S_r$ may be interpolated based on the depths generated by depth-measuring devices located along the streamer.

In order to relate the measured pressure data $P(\vec{x}_r, \vec{x}_s, \omega)$ to the normal derivative of the pressure data $\vec{n}\cdot\nabla P(\vec{x}_r, \vec{x}_s, \omega)$, Equation (13) is solved for the case $\alpha=\frac{1}{2}$. In other words, the coordinates $\vec{x}_{vs}$ of the virtual sources (i.e. the Green's function sources) are moved to the streamer to obtain the following integral equation:

$$\frac{1}{2}P(\vec{x}_{vs}, \omega) = \int_{S_r}\left[G(\vec{x}_r, \vec{x}_{vs}, \omega)\frac{\partial P(\vec{x}_r, \vec{x}_s, \omega)}{\partial n} - \frac{\partial G(\vec{x}_r, \vec{x}_{vs}, \omega)}{\partial n}P(\vec{x}_r, \vec{x}_s, \omega)\right]dS_r \quad (14)$$

The surface integral given by Equation (14) numerically as follows. The surface $S_r$ is broken into K small area elements dxdy. The pressure data and its normal derivative are considered constant over each of the small area elements and are equal to their respective values at the center of each element. Mapping the area elements onto a flat surface using $dS_r = \gamma dxdy$ and moving the virtual sources to coincide with actual receivers along the streamer $S_r$, Equation (14) may be re-written as the following system of equations:

$$\frac{1}{2}P(\vec{x}_{vs}, \omega) = \sum_{\substack{r=1 \\ r \neq vs}}^{K} M_{vs,r} \frac{\partial P(\vec{x}_r, \vec{x}_s, \omega)}{\partial n} - \sum_{\substack{r=1 \\ r \neq vs}}^{K} D_{vs,r} P(\vec{x}_r, \vec{x}_s, \omega) \quad (15)$$

where $$M_{vs,r} = G(\vec{x}_r, \vec{x}_{vs}, \omega) \gamma dxdy;$$

$$D_{vs,r} = \left[\left(-\frac{\partial z(x,y)}{\partial x}\hat{i} - \frac{\partial z(x,y)}{\partial y}\hat{j} + \hat{k}\right)dxdy\right] \cdot \nabla G(\vec{x}_r, \vec{x}_{vs}, \omega);$$

"·" represents the scalar or dot product;

$\vec{x}_{vs}$ is a vs-th virtual source coordinate along the streamer $S_r$ (i.e. both the virtual sources ($\vec{x}_{vs}$) and the actual receivers ($\vec{x}_r$) are at the same location); and vs=1, . . . , K.

The normal derivative of the pressure wavefield at each of the K receiver locations may be determined from the set of Equations (15) by first rewriting the set of Equations (15) in matrix form as follows:

$$\frac{1}{2}\vec{P} = \overline{M}\frac{\partial \vec{P}}{\partial n} - \overline{D}\vec{P} \quad (16)$$

where $\overline{M}$ is called a "monopole matrix" with matrix elements $M_{vs,r}$;

$\overline{D}$ is called a "dipole matrix" with matrix elements $D_{vs,r}$; and $\vec{P} = [P(\vec{x}_1, \vec{x}_s, \omega) \ P(\vec{x}_2, \vec{x}_s, \omega) \ldots P(\vec{x}_K, \vec{x}_s, \omega)]^T$.

Note that because the virtual sources coincide with the receivers located along the streamer $S_r$, $P(\vec{x}_r, \vec{x}_s, \omega)$ equals $P(\vec{x}_{vs}, \omega)$ for the index r equal to the index vs in Equation (16) and the source coordinates may be suppressed. The diagonal elements the monopole and dipole matrices $\overline{M}$ and $\overline{D}$ are singular and may be replaced by estimates over the discretization path as follows:

$$M_{rr} = \int_{-dx/2}^{dx/2} \int_{-dy/2}^{dy/2} G(\vec{x}_r, \vec{x}, \omega) \gamma dx dy \quad (17a)$$

$$D_{rr} = \int_{-dx/2}^{dx/2} \int_{-dy/2}^{dy/2} \left[\left(-\frac{\partial z(x,y)}{\partial x}\hat{i} - \frac{\partial z(x,y)}{\partial y}\hat{j} + \hat{k}\right)dxdy\right] \cdot \nabla G(\vec{x}_r, \vec{x}, \omega) \quad (17b)$$

The normal derivative of the measured pressure wavefield at each $\vec{x}_r$, $\vec{n} \cdot \nabla P(\vec{x}_r, \omega)$, may be computed as a function of the measured pressure data at each $\vec{x}_r$, $P(\vec{x}_r, \omega)$, by solving for $\partial \vec{P}/\partial n$ in Equation (16) to obtain:

$$\frac{\partial \vec{P}}{\partial n} = \overline{M}^{-1}\left[\frac{1}{2}\overline{I} + \overline{D}\right]\vec{P} \quad (18)$$

where $\overline{I}$ is a K×K identity matrix.

Equation (18) may be used to compute the normal derivative of the measured pressure wavefield at each receiver location $\vec{x}_r$, $\vec{n} \cdot \nabla P(\vec{x}_r, \omega)$. Approximate normal-velocity data at each receiver location $\vec{x}_r$ along the streamer may be calculated according to:

$$\tilde{V}_{\vec{n}}(\vec{x}_r, \omega) = -\frac{i}{\rho\omega}\vec{n} \cdot \nabla P(\vec{x}_r, \omega) \quad (19)$$

The approximate normal-velocity data computed for a number of receiver locations forms an approximate normal-velocity wavefield.

Figure 10:
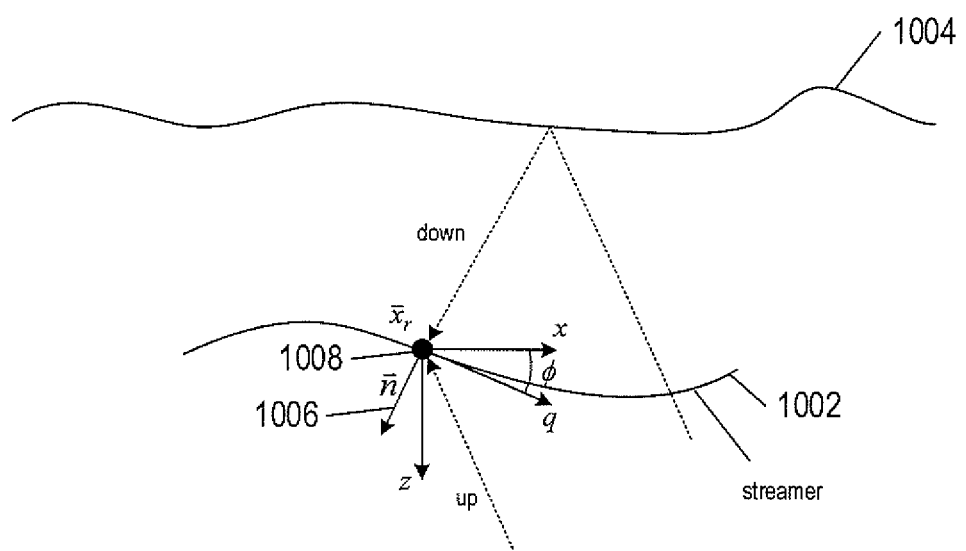
FIG. 10 shows a segment of a streamer located beneath a free surface.

The approximate normal-velocity data $\tilde{V}_{\vec{n}}(\vec{x}_r, \omega)$ approximates the normal particle velocity that a particle motion sensor would have measured at the receiver location $\vec{x}_r$. However, unlike the normal particle velocity data that an actual particle motion sensor would generate, the approximate normal-velocity data $\tilde{V}_{\vec{n}}(\vec{x}_r, \omega)$ does not include the low-frequency noise (e.g., does not include streamer vibration noise). Approximate vertical-velocity data $\tilde{V}_z(\vec{x}_r, \omega)$ may be computed at the receiver location $\vec{x}_r$ from the approximate normal-velocity data $\tilde{V}_{\vec{n}}(\vec{x}_r, \omega)$ based on the orientation of the receiver as shown in FIG. 10. FIG. 10 shows a segment of a streamer 1002 located beneath a free surface 1004 in the xz-plane. A normal vector 1006 to the streamer 1002 at the receiver 1008 is given by:

$$\vec{n} = (n_x, n_z) = (-\sin\phi, \cos\phi) = \left(-\frac{dz_r}{dx}, \frac{dx_r}{dq}\right) \quad (20)$$

The resulting approximate vertical-velocity data at the receiver location $\vec{x}_r$ is given by:

$$\tilde{V}_z(\vec{x}_r, \omega) = \cos\phi \cdot \tilde{V}_{\vec{n}}(\vec{x}_r, \omega) \quad (21)$$

The approximate vertical-velocity data $\tilde{V}_z(\vec{x}_r, \omega)$ also does not include the low-frequency noise typically recorded by a particle motion sensor. The approximate vertical-velocity data $\tilde{V}_z(\vec{x}_r, \omega)$ may be transformed from the space-frequency domain to the k-f domain using an FFT or DFT to obtain $\tilde{V}_z(k_x, k_y, \omega|z_r)$, which may be used to compute combined vertical-velocity wavefield given by Equation (6) and separate approximate up-going and down-going pressure wavefields according to Equations (10a) and (10b). As a result, the combined vertical-velocity wavefield and the separate approximate up-going and down-going pressure wavefields do not include the low-frequency noise.

Calculation of the Green's function and normal derivative of the Green's function used in Equation (18) to compute the normal derivative of the pressure wavefield at the receiver location $\vec{x}_r$, $\vec{n} \cdot \nabla P(\vec{x}_r, \omega)$, are now described. The Green's function is the reflectivity of the free surface $S_{fs}$ and the normal derivative of the Green's function is the normal derivative of the reflectivity at the free surface. The following description presents a technique for computing the Green's function and normal derivative of the Green's function used in Equation (18).

Figure 11A:
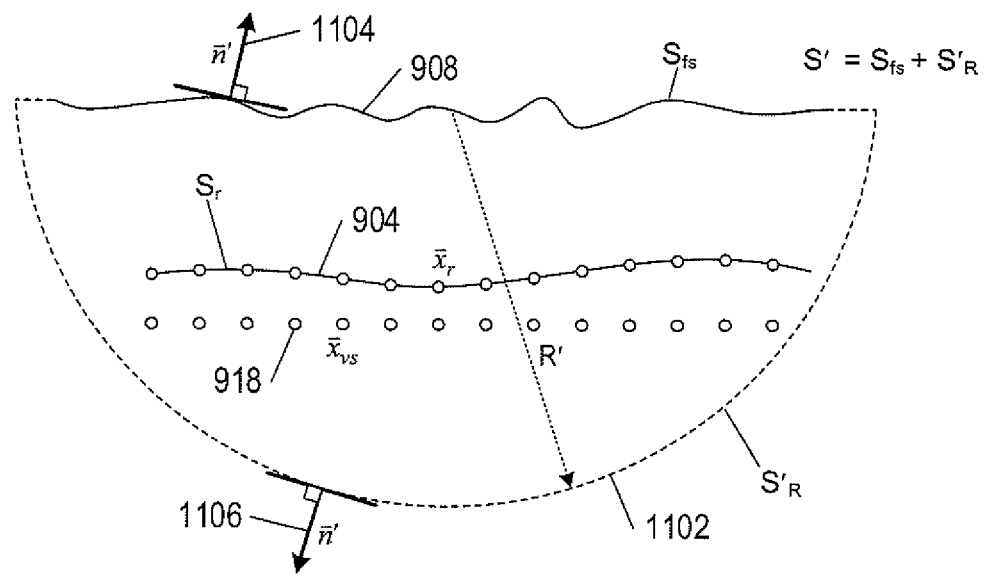
FIGS. 11A-11B show model geometries used to compute a Green's function and normal derivative of the Green's function.
Figure 11B:
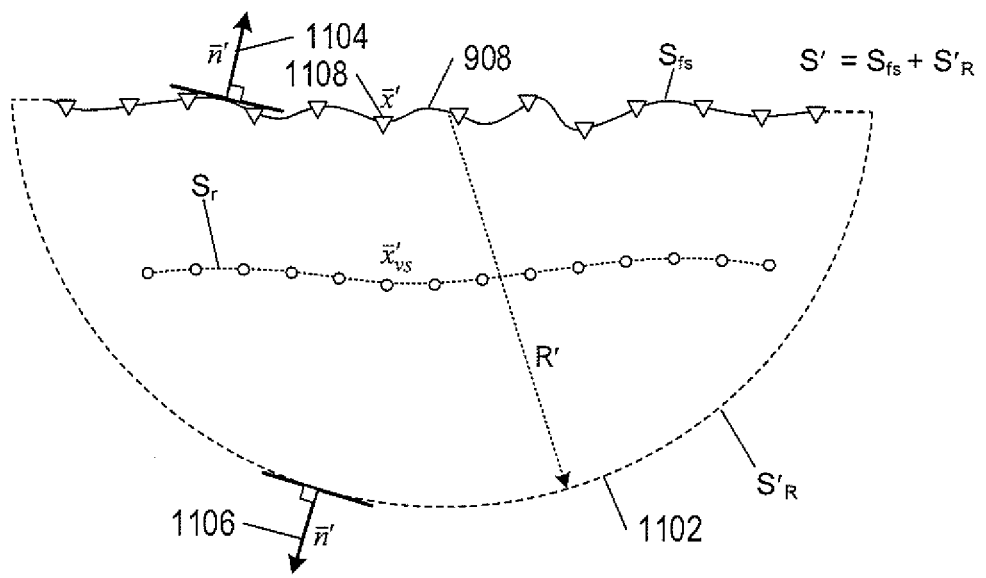

FIGS. 11A-11B shows model geometries used to define a Green's function and its normal derivative. In FIG. 11A, a closed surface S' is composed a hemispherical cap S'$_R$ of radius R' represented by a dashed-line curve 1102 and the free surface S$_{fs}$ represented by the curve 908. Unlike the closed surface S that enclosed the free surface S$_{fs}$ as shown in FIG. 9B, in FIG. 11A the close surface S' encloses the streamer S$_r$ and the virtual sources with coordinates Directional arrows 1104 and 1106 represent unit normal vectors, denoted by directed orthogonal to the surface FIG. 11B represents a model state in which the space occupied by the water is homogeneous and the free surface 908 is considered a mathematical boundary surface of the closed surface S'. Coordinates of points located along the free surface S$_{fs}$ are denoted by $\vec{x}'$ and are represented by triangles, such as triangle 1108.

A Green's function for the model shown in FIG. 11A may be determined by coupling the two model states represented in FIGS. 11A-11B using Equation 13 with the Sommerfeld radiation condition over the hemispherical cap S'$_R$ and imposing a free surface boundary condition on the free surface S$_{fs}$ given by $$G(\vec{x}', \vec{x}_{vs}, \omega)_{\vec{x}'=\vec{x}_{fs}} = 0$$

in order to obtain $$\beta G(\vec{x}'_{vs}, \omega) = \quad (22a)$$

$$G^0(\vec{x}_{vs}, \vec{x}'_{vs}, \omega) + \int_{S_{fs}} dS_{fs} G^0(\vec{x}', \vec{x}'_{vs}, \omega) \frac{\partial G(\vec{x}', \vec{x}_{vs}, \omega)}{\partial n'}$$

where
G is the Green's function or reflectivity of the free surface;

$$\frac{\partial}{\partial n'} = \vec{n}' \cdot \nabla$$

represents the normal derivative directed orthogonal to the free surface S$_{fs}$;

$$\beta = \begin{cases} 1 & \text{if } \vec{x}'_{vs} \text{ is inside } S' \\ 0 & \text{if } \vec{x}'_{vs} \text{ is outside } S' \end{cases};$$

and
G$^0$ is a free space Green's function.

The free-space Green's functions appearing in Equation (22a) and in subsequent Equations below is represented in general by:

$$G^0(\vec{y}, \vec{y}', \omega) = \frac{1}{4\pi\|\vec{y}-\vec{y}'\|} \exp(-ik_0\|\vec{y}-\vec{y}'\|) \quad (22b)$$

where
i is the imaginary unit $\sqrt{-1}$;
"$\|\cdot\|$" is Euclidean distance;
$k_0 = \omega/c_0$; and $\vec{y}$ and $\vec{y}'$ represent general coordinate locations of two different points in the space represented in FIGS. 11A-11B.

The unit normal vector $\vec{n}'$ at any point along the free surface in Equation (22a) is given by $$\vec{n}' = \frac{-\frac{\partial f(x,y)}{\partial x}\hat{i} - \frac{\partial f(x,y)}{\partial y}\hat{j} + \hat{k}}{\delta}$$

where $$\delta = \sqrt{1 + \left[\frac{df(x,y)}{dx}\right]^2 + \left[\frac{df(x,y)}{dy}\right]^2};$$

and
f(x, y) approximates the profile or shape of the free surface S$_{fs}$ above the streamer (i.e., f(x, y) is the approximate frozen free-surface profile).

Methods for computing the approximate frozen free-surface profile f(x, y) of the free surface S$_{fs}$ are described below with reference to FIGS. 12-21. Note that the Green's function G($\vec{x}'$, $\vec{x}_{vs}$, $\omega$) represents the reflectivity resulting from two sources. The first source is the Dirac delta pulse and the second source is the free surface. A technique for computing the Green's function and the normal derivative of the Green's function at streamer locations $\vec{x}_r$ based on Equation (22a) is summarized as follows. First, the parameter β in Equation (22a) is set to one. Next, letting $\vec{x}'_{vs}$ approach the free surface and using the boundary condition $G(\vec{x}'_{vs}, \omega)|_{\vec{x}'_{vs}=\vec{x}_{fs}} = 0$, Equation (22a) becomes:

$$G^0(\vec{x}_{vs}, \vec{x}_{fs}, \omega) = \int_{S_{fs}} dS_{fs} G^0(\vec{x}', \vec{x}_{fs}, \omega) \frac{\partial G(\vec{x}', \vec{x}'_{vs}, \omega)}{\partial n'} \quad (23a)$$

Next, the computed normal derivative of the Green's function at the free surface given by Equation (23a) is replaced in Equation (22a) and then setting β=1 and $\vec{x}_{fs}=\vec{x}_r$, the Green's function at the streamer location $\vec{x}_r$ is given by:

$$G(\vec{x}_r, \omega) = G^0(\vec{x}_{vs}, \vec{x}_r, \omega) + \int_{S_{fs}} dS_{fs} G^0(\vec{x}', \vec{x}_r, \omega) \frac{\partial G(\vec{x}', \vec{x}_{vs}, \omega)}{\partial n'} \quad (23b)$$

Finally, taking the normal derivative of the Green's function given by Equation (23b) at the receiver locations gives $$\frac{\partial G(\vec{x}_r, \omega)}{\partial n} = \quad (23c)$$

$$\frac{\partial G^0(\vec{x}_{vs}, \vec{x}_r, \omega)}{\partial n} + \int_{S_{fs}} dS_{fs} \frac{\partial G^0(\vec{x}', \vec{x}_r, \omega)}{\partial n} \frac{\partial G(\vec{x}', \vec{x}_{vs}, \omega)}{\partial n'}$$

The Green's function G($\vec{x}_r$, ω) in Equation (23b) represents the reflectivity at receiver locations along the streamer and $\vec{n} \cdot \nabla G(\vec{x}_r, \omega)$ in Equation (23c) represents the normal derivative of the reflectivity at receiver locations along the streamer.

The Green's function $G(\vec{x}_r, \omega)$ and the normal derivative if $\vec{n} \cdot \nabla G(\vec{x}_r, \omega)$ may be computed numerically and substituted into Equation (18). The surface $S_{fs}$ is broken into K small area elements dxdy. The Green's function and the normal derivative of the Green's function are considered constant over each small area element and are equal to their respective values at the center of each small area element. By mapping curved small area elements onto a flat surface $$dS_{fs} = \delta dxdy$$

Equation (23a) may be rewritten as $$G^0(\vec{x}_{vs}, \vec{x}_r, \omega) = \begin{cases} \sum_{k=1}^{K} \delta dxdy G^0(\vec{x}'_k, \vec{x}_r, \omega) \frac{\partial G(\vec{x}'_k, \vec{x}_{vs}, \omega)}{\partial n'}, & k \neq r \\ \int_{-dx/2}^{dx/2}\int_{-dy/2}^{dy/2} \delta dxdy G^0(\vec{x}'_k, \vec{x}, \omega) \frac{\partial G(\vec{x}'_k, \vec{x}_{vs}, \omega)}{\partial n'}, & k = r \end{cases} \quad (24a)$$

Equation (23b) may be rewritten as $$G(\vec{x}_r, \omega) = G^0(\vec{x}_{vs}, \vec{x}_r, \omega) + \sum_{k=1}^{K} \delta dxdy G^0(\vec{x}'_k, \vec{x}_r, \omega) \frac{\partial G(\vec{x}'_k, \vec{x}_{vs}, \omega)}{\partial n'} \quad (24b)$$

and Equation (23c) may be rewritten as $$\frac{\partial G(\vec{x}_r, \omega)}{\partial n} = \frac{\partial G^0(\vec{x}_{vs}, \vec{x}_r, \omega)}{\partial n} + \sum_{k=1}^{k} \delta dxdy \frac{\partial G^0(\vec{x}'_k, \vec{x}_r, \omega)}{\partial n} \frac{\partial G(\vec{x}'_k, \vec{x}_{vs}, \omega)}{\partial n'} \quad (24c)$$

Equations (24a)-(24c) may be used to compute the Green's function G, which is then substituted into Equation (18) to compute the normal derivative of the pressure wavefield.

The shape or profile of the free surface at the time the pressure wavefield was measured is assumed to be in a fixed or frozen-in-time state called a "frozen free surface." The approximate frozen free-surface profile f(x, y) approximates the actual, unknown, frozen-in-time state or profile of the free surface above the pressure sensors when the pressure wavefield was measured, which is used to compute the unit normal vector $\vec{n}'$. Computing an approximate free-surface profile above a streamer is now described with reference to Equations (25)-(38) and FIGS. 12-21.

Figure 12:
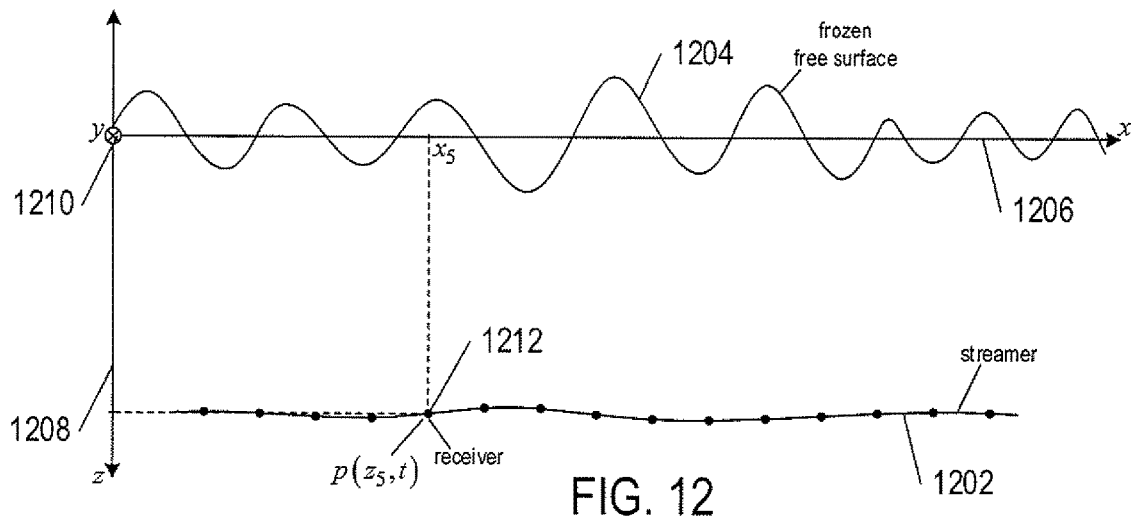
FIG. 12 shows a side-elevation view of a streamer located in a body of water below a frozen free surface.

FIG. 12 shows a side-elevation view of a streamer 1202 located in a body of water below a frozen free surface 1204. In FIG. 12, horizontal axis 1206 represents the in-line, or x-direction, vertical axis 1208 represents depth, and circle 1210 represents the cross-line or, y-direction, orthogonal to the xz-plane. The depth $z_r$ and the elevation of the free surface are estimated with respect to the local geoid, which corresponds to the x-axis 1206. The geoid is the hypothetical surface of the earth that coincides with the mean sea level and is used to define zero elevation (i.e., z=0). As illustrated, the streamer 1202 includes 14 spaced apart receivers (the number of receivers may vary in other embodiments), such as receiver 1212, that each measure a different portion of a pressure wavefield. The streamer 1202 may be part of larger data acquisition surface composed of any number of streamers towed by a survey vessel not shown. Each receiver may generate pressure data $p(\vec{x}_r, t)$ as described with reference to Equation (1), such as pressure data $p(\vec{x}_5, t)$ generated for the fifth receiver 1212 of the streamer 1202. The frozen free surface 1204 represents a side elevation view or profile of the free surface above the streamer 1202 when the pressure wavefield is measured by the receivers located along the steamer 1202. In practice, the actual shape of the frozen free surface 1204 is not known. Computation of an approximate frozen free surface of the actual frozen free surface 1204 is now described with reference to FIGS. 13-21.

Figure 13:
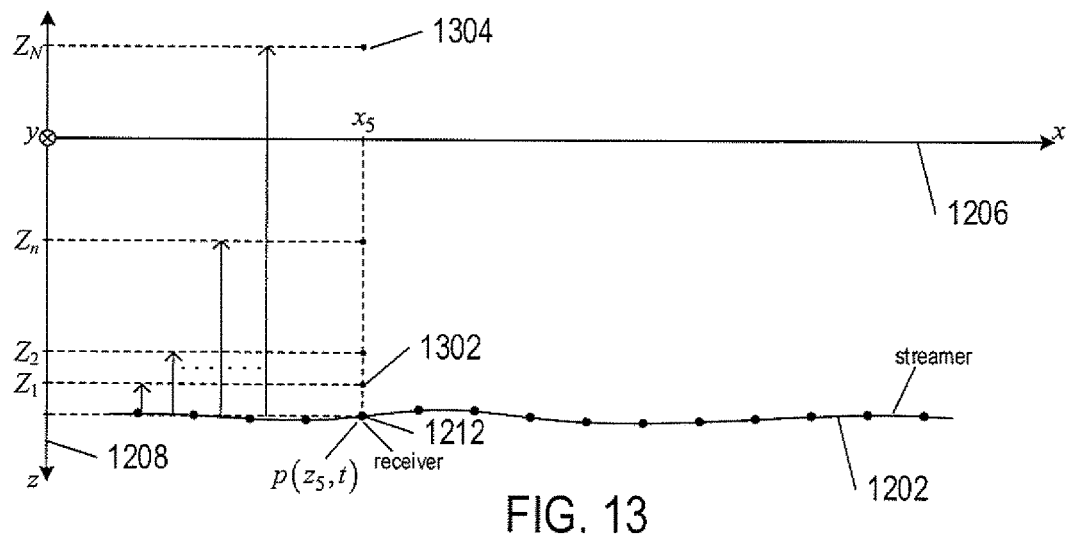
FIG. 13 shows a streamer and an example series of trial depths.

The fixed cross-sectional shape of an approximate frozen-free surface is computed by forward and backward extrapolation of the pressure wavefield at a series of trial depths above the streamer. FIG. 13 shows the streamer 1202 and an example series of trial depths $Z_1$ through $Z_N$, where N is a positive integer. Dots, such as dot 1302, identify the series of trial depths above the receiver 1212. In this example, the trial depths extend to a final trial depth $Z_N$ 1304. Although the trial depths are shown in FIG. 13 as being regularly spaced, in practice the trial depths are not restricted to being regularly spaced. The spacing between trail depths may vary.

Extrapolation is carried out by first transforming the pressure data generated by each receiver from the s-t domain to the k-f domain as follows:

$$p(\vec{x}_r, t) \xrightarrow{FT} P(k_x, k_y, \omega | z_r) \quad (25)$$

The transformation may be executed with an FFT or a DFT. Next, at each trial depth, the pressure data generated at each receiver is forward and backward extrapolated to the trial depth level to obtain forward and backward extrapolated wavefields that correspond to the trial depth. For each receiver, the pressure data is forward extrapolated to a trial depth $Z_n$ according to $$P^F(k_x, k_y, \omega | Z_n) = P(k_x, k_y, \omega | z_r) e^{-ik_z(z_r - z_n)} \quad (26)$$

and backward extrapolated to the same trial depth $Z_n$ according to $$P^B(k_x, k_y, \omega | Z_n) = P(k_x, k_y, \omega | z_r) e^{ik_z(z_r - z_n)} \quad (27)$$

where
  $k_x$ is the horizontal wavenumber in the x-direction;
  $k_y$ is the horizontal wavenumber in the y-direction; and
  $k_z = \sqrt{k^2 - k_x^2 - k_y^2}$.

For each trial depth $Z_n$, the forward and backward extrapolated pressure data associated with each receiver is then transformed from the k-f domain back to the s-t domain:

$$P^F(k_x, k_y, \omega | Z_n) \xrightarrow{IFT} p^F(x_r, y_r, t | Z_n) \quad (28a)$$

$$P^B(k_x, k_y, \omega | Z_n) \xrightarrow{IFT} p^B(x_r, y_r, t | Z_n) \quad (28b)$$

where
  superscript "F" represents forward extrapolated; and
  superscript "B" represents backward extrapolated.

The transformation may be executed with an IFFT or an IDFT.

Figure 14:
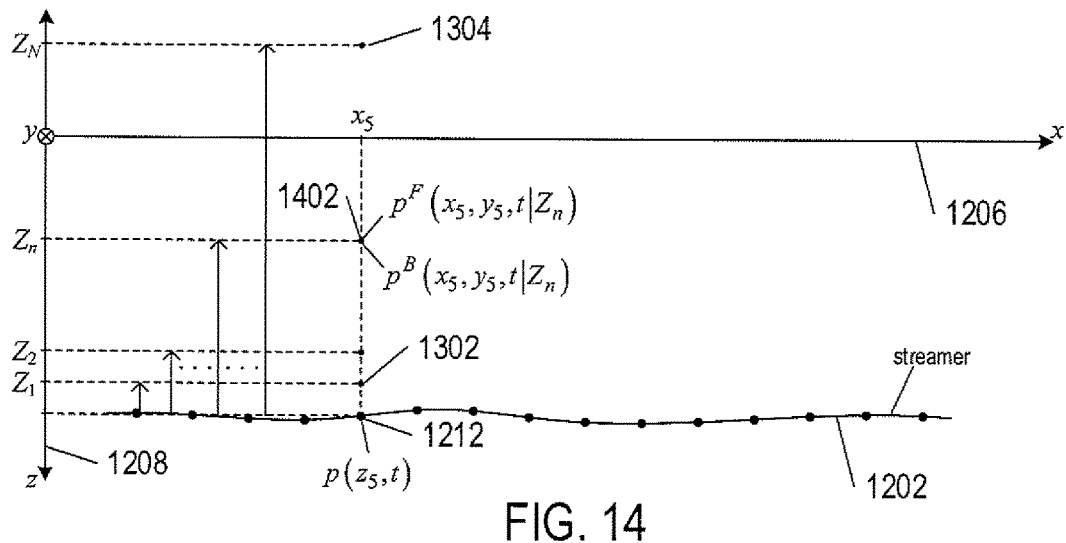
FIG. 14 shows an example of forward and backward extrapolated pressure wavefield data at a trial depth.

FIG. 14 shows an example of forward and backward extrapolated pressure data at the trial depth $Z_n$ 1402 for the fifth receiver 1212. The forward and backward extrapolated pressure data at the trial depth $Z_n$ are represented by $p^F(x_5, y_5, t|Z_n)$ and $p^B(x_5, y_5, t|Z_n)$, respectively. For each trial depth $Z_n$ with n=1, ..., N, forward and backward extrapolated pressure data $p^F(x_r, y_r, t|Z_n)$ and $p^B(x_r, y_r, t|Z_n)$ are computed for each receiver (i.e., r=1, ..., 14) of the streamer 1202.

For each trial depth $Z_n$, the forward extrapolated pressure data computed for each receiver are collected to form a forward extrapolated gather $$p^F(x, y, t|Z_n) = \{p^F(x_r, y_r, t|Z_n)\}_{r=1}^R \quad (29a)$$

where R is the number of receivers.
Backward extrapolated pressure data computed for each receiver are also collected to form a backward extrapolated gather $$p^B(x, y, t|Z_n) = \{p^B(x_r, y_r, t|Z_n)\}_{r=1}^R \quad (29b)$$

Figure 15:
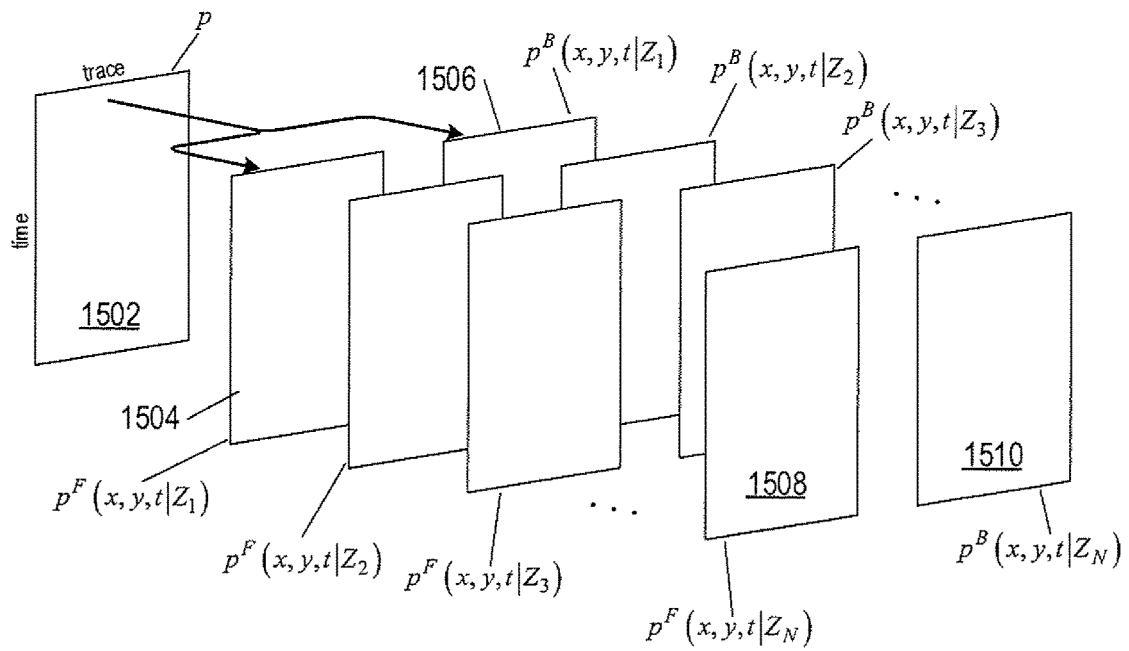
FIG. 15 shows a series of forward extrapolated gathers and corresponding backward extrapolated gathers for a series of trial depths.

FIG. 15 shows a series of forward extrapolated gathers and corresponding backward extrapolated gathers computed for each trial depth $Z_n$ with n=1, ..., N. Rectangle 1502 represents a common-shot gather of pressure data p generated by a number of receivers located along a streamer. Pairs of rectangles represent the forward and backward extrapolated gathers computed for each of the trial depths $Z_n$. For example, pair of rectangles 1504 and 1506 represent forward and backward extrapolated gathers for the first trial depth $Z_1$, and pair of rectangles 1508 and 1510 represent forward and backward extrapolated gathers for the final trial depth $Z_N$.

A difference gather may be computed for each pair of forward and backward extrapolated gathers. In other words, for each trial depth $Z_n$, a difference gather is computed as follows:

$$d(x, y, t|Z_n) = p^F(x, y, t|Z_n) - p^B(x, y, t|Z_z) \quad (30)$$

Amplitudes of the forward extrapolated gather $p^F(x, y, t|Z_n)$ are represented by $a_r^F(t_j|Z_n)$ and amplitudes of the backward extrapolated gather $p^B(x, y, t|Z_n)$ are represented by $a_r^B(t_j|Z_n)$, where r is a trace index, $t_j$ is the time sample index, and $Z_n$ identifies the trial depth. Amplitude differences, $A_r(t_j|Z_n)$, for each difference gather $d(x, y, t|Z_n)$ may be executed according to the following pseudo code:

```
1  for n = 1, ..., N {                           //trial depth
2      for r = 1, ..., R {                       //receivers/traces
3          for j = 1, ..., J {                   //time samples
4              A_r(t_j|Z_n) = a_r^F (t_j|Z_n) - a_r^B
   (t_j|Z_n);
5          }
6      }
7      store difference gather                   ;//gather
       d(x, y, t|Z_n) = {{A_r(t_j|Z_n)}_{j=1}^J}_{r=1}^R
8  }
```

Figure 16:
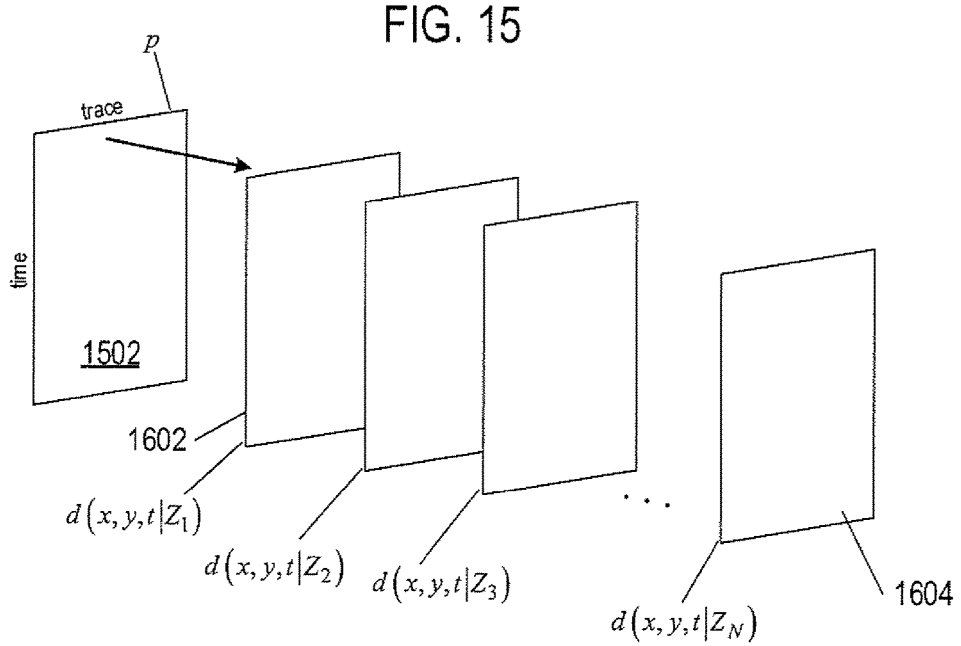
FIG. 16 shows difference gathers computed from pairs of forward and backward extrapolated gathers shown in FIG. 13.

FIG. 16 shows difference gathers computed from the pairs of forward and backward extrapolated gathers shown in FIG. 15. Rectangle 1602 represents a difference gather obtained by computing the difference between the pair of forward and backward extrapolated gathers 1504 and 1506 shown in FIG. 15. Rectangle 1604 represents a difference gather obtained by computing the difference between the pair of forward and backward extrapolated gathers 1508 and 1510 shown in FIG. 15.

Figure 17A:
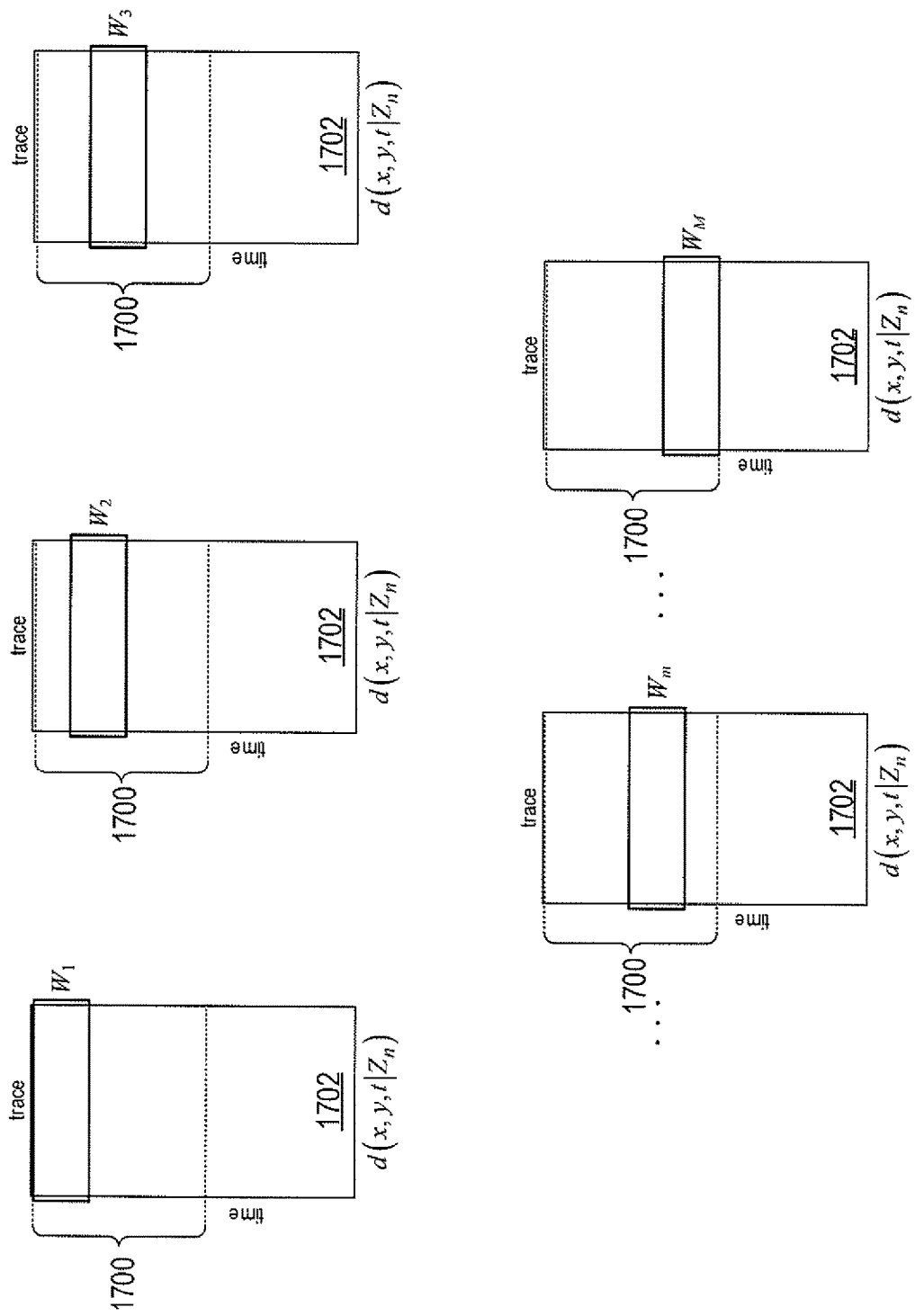
FIGS. 17A-17C show an example calculation of a maximum energy difference for a series of time windows.
Figure 17B:
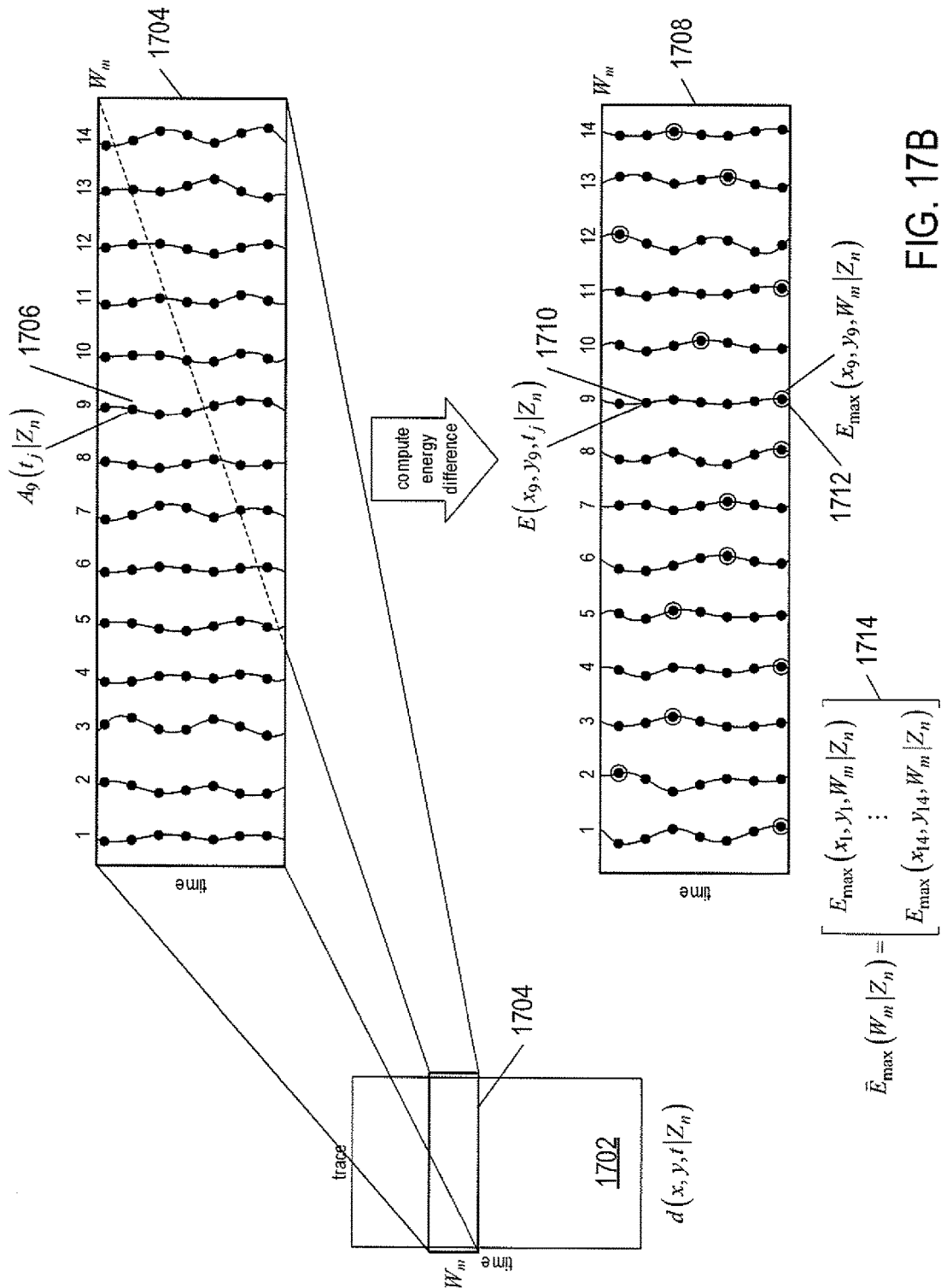
Figure 17C:
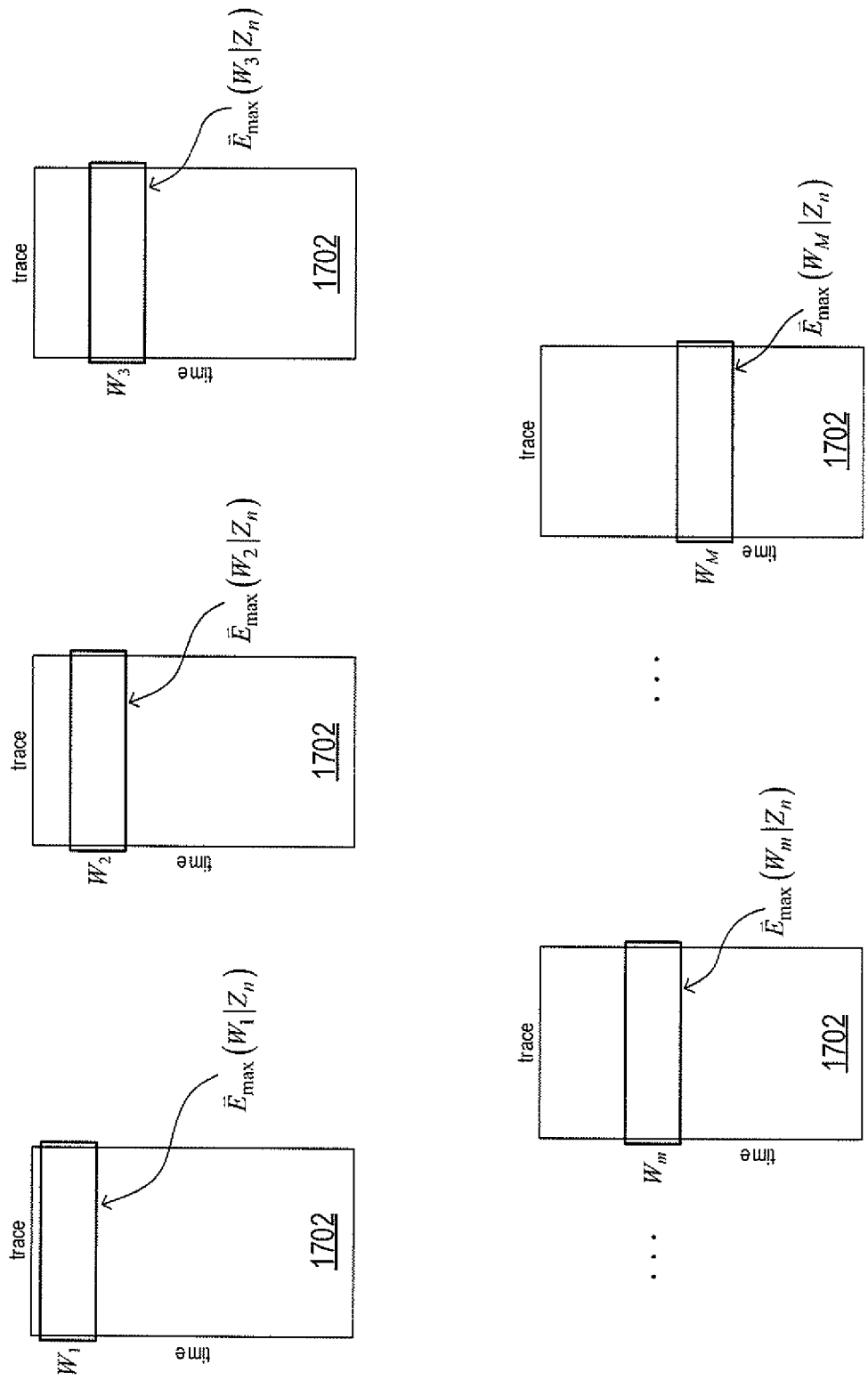

A series of time windows are applied to each difference gather and a maximum energy difference is calculated for each time window. FIGS. 17A-17C show an example calculation of a maximum energy difference for each time window. FIG. 17A shows an example of a series of time windows applied to a time region 1700 of a difference gather $d(x, y, t|Z_n)$ 1702. In this example, the time windows are represented by rectangles that span a time subinterval and the full set of traces of the difference gather 1702. The time windows are denoted by $W_m$, where m=1, ..., M is the time window index and M is the total number of time windows in the time window series. Initially, time window $W_1$ is located over the earliest time interval of the difference gather 1702, time window $W_m$ is located over an intermediate time interval, and time window $W_M$ is located over a later time interval. In certain implementations the time windows may intersect while in other implementations the time windows may not intersect. In alternative implementations, the time windows and the region of the difference gather the series of time windows are applied to may be hyperbolic in order to approximate the curved shaped of reflections created by source receiver offset in common-shot gathers described above with reference to FIG. 4. In still other implementations, the time series windows may be applied to the full difference gather.

FIG. 17B shows an enlargement of a time window $W_m$ represented by a rectangle 1704 located over a time interval of the difference gather 1702 shown in FIG. 17A. Solid circles located within the time window $W_m$ represent amplitude differences $A_r(t_j|Z_n)$ calculated according to Equation (30). For example, solid circle 1706 represents an amplitude difference $A_9(t_j|Z_n)$ calculated for a trace r=9. For each amplitude difference in the time window $W_m$, a corresponding energy difference is calculated according to $$E(x_r, y_r, t_j \in W_m|Z_n) = [A_r(t_j|Z_n)]^2 \quad (31)$$

Rectangle 1708 represents the time window $W_m$ with energy differences calculated according to Equation (31) for each of the amplitude differences in the time window $W_m$. For example, solid circle 1710 represents the energy difference $E(x_9, y_9, t_j|Z_n)$ for the 9-th trace at the j-th time sample computed according to Equation (31). A maximum energy difference is determined for each trace with time samples in the time window $W_m$ according to:

$$E_{max}(x_r, y_r, W_m | Z_n) = \max_t \{E(x_r, y_r, t_j \in W_m | Z_n)\} \quad (32)$$

The quantity $E_{max}(x_r, y_r, W_m|Z_n)$ represents the maximum energy difference for the r-th trace in the time window $W_m$. In FIG. 17B, open circles identify the maximum energy difference of each trace. For example, open circle 1712 identifies the maximum energy difference $E_{max}(x_9, y_9, W_m|Z_n)$ of the 9-th trace with time samples in the time window $W_m$. The maximum energy differences in the time window $W_m$ are collected to form a vector of maximum energy-differences given by:

$$\vec{E}_{max}(W_m|Z_n) = [E_{max}(x_1, y_1, W_m|Z_n) \ldots E_{max}(x_R, y_R, W_m|Z_n)]^T \quad (33)$$

For example, in FIG. 17B, vector 1714 represents the vector of maximum energy-differences for the time window $W_m$.

FIG. 17C shows the time windows shown in FIG. 17A with corresponding vectors of maximum energy differences computed for each time window. For example, time window $W_1$ has associated vector of maximum energy differences $\vec{E}_{max}(W_1|Z_n)$, and time window $W_2$ has associated vector of maximum energy differences $\vec{E}_{max}(W_2|Z_n)$.

Figure 18:
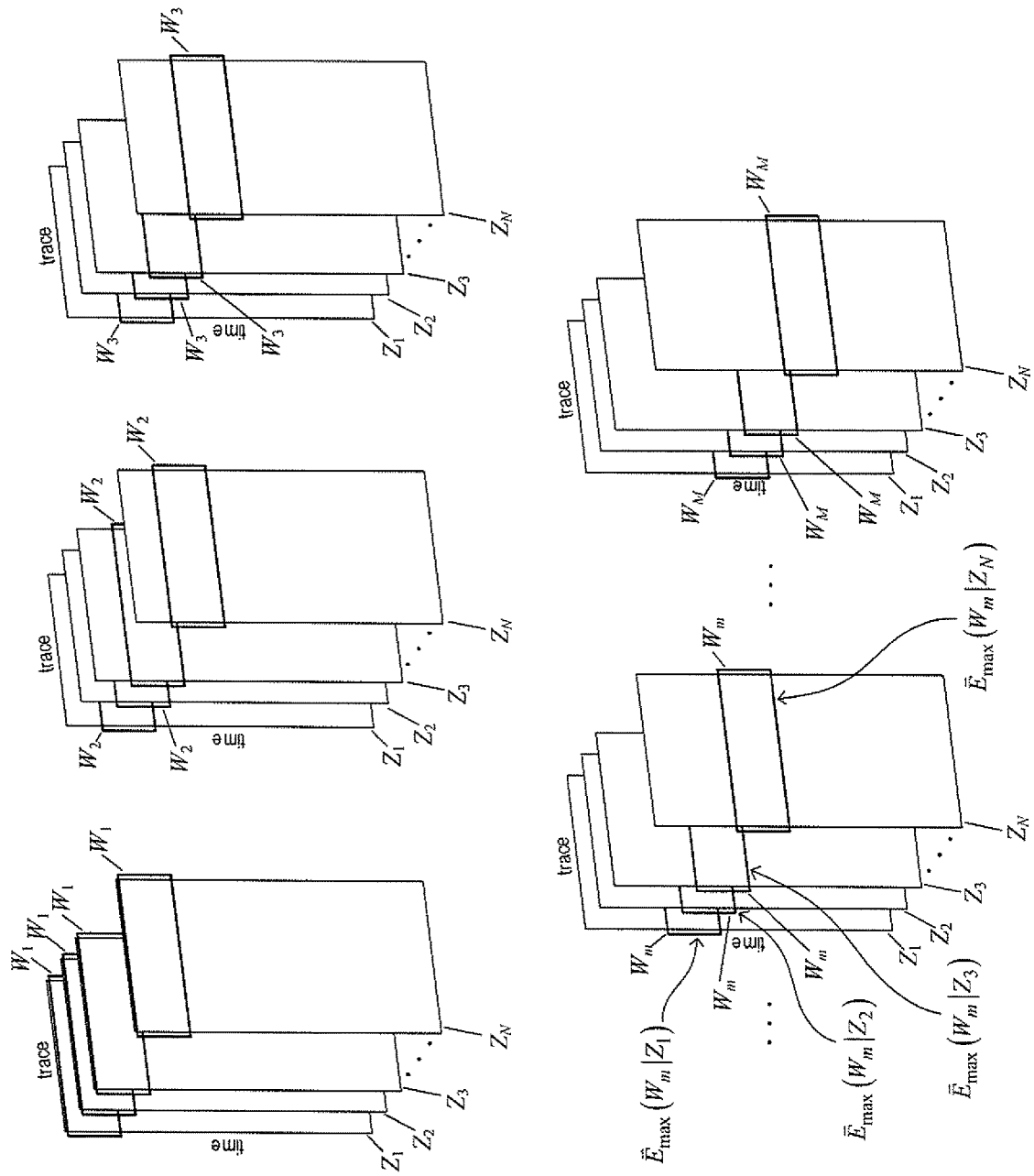
FIG. 18 shows time windows applied to difference gathers associated with different trial depths.

Next, for each time window applied to the N difference gathers, a peak energy is computed from the N vectors of maximum energy differences calculated for the time window. FIG. 18 shows the M time windows applied to the N difference gathers, each of which is identified by a trial depth $Z_n$. For example, time window $W_m$ is applied to each of the N difference gathers over the same time interval and a vector of maximum energy difference $\vec{E}_{max}(W_m|Z_n)$ is computed for each of the N difference gathers. The maximum energy differences of the vectors of maximum energy differences formed for the time window $W_m$ applied to each of the N difference gathers are collected to form a set of maximum energy differences $\{E_{max}(x_r, y_r, W_m|Z_n)\}$ for $r=1, \ldots, R$ and $n=1, \ldots, N$. For each time window $W_m$, a peak energy is then identified from the set of maximum energy differences $$E_{peak}(x_r, y_r, z_{peak,r}) = \max_n \{E_{max}(x_r, y_r, W_m | Z_n)\} \qquad (34)$$

where $z_{peak,r}$ equals the trial depth $Z_n$ of the maximum energy difference in the set $\{E_{max}(x_r, y_r, W_m|Z_n)\}$.

Each maximum energy difference $E_{max}(x_r, y_r, W_m|Z_n)$ in the set $\{E_{max}(x_r, y_r, W_m|Z_n)\}$ corresponds to a receiver as described above with reference to FIG. 17B. As a result, receiver coordinates $(x_r, y_r)$ associated with the peak energy $E_{peak}(x_r, y_r, z_{peak,r})$ are the receiver coordinates associated with $z_{peak,r}$, which includes the subscript r to identify the receiver. The peaks $z_{peak,r}$ and associated receiver coordinates $(x_r, y_r)$ are collected to form a set of points $\{(x_r, y_r, z_{peak,r})\}$ that approximate the shape of the frozen free surface above the streamer.

Figure 19:
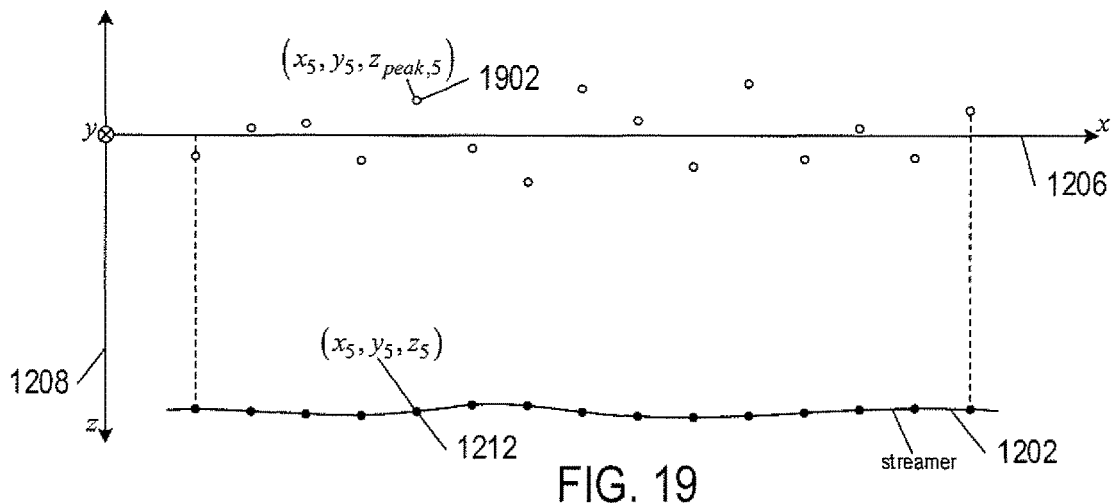
FIG. 19 shows a side-elevation view of a set of points above receivers that approximate a frozen free surface.

FIG. 19 shows a side-elevation view of the streamer 1202 and set of points $\{(x_r, y_r, z_{peak,r})\}$ that form an approximate frozen free-surface profile of frozen free surface 1204 at receiver locations described above with reference to FIG. 12. Open circles represent points in the set $\{(x_r, y_r, z_{peak,r})\}$. For example, open circle 1902 represents a point $(x_5, y_5, z_{peak,5})$ above the fifth receiver 1212 with receiver coordinates $(x_5, y_5, z_5)$. The points in the set $\{(x_r, y_r, z_{peak,r})\}$ approximate the side elevation or profile of the frozen free surface shown in FIG. 12 at the time the pressure wavefield used to compute the set of points $\{(x_r, y_r, z_{peak,r})\}$ was measured.

The side-elevation shape or profile of the frozen free surface above the streamer may be approximated by interpolating over the set of points $\{(x_r, y_r, z_{peak,r})\}$. For example, polynomial interpolation, spline interpolation, and Gaussian interpolation may be used to compute a function or polynomial that approximates the side-elevation shape or profile of the frozen free surface above the streamer based on the set of points $\{(x_r, y_r, z_{peak,r})\}$.

Figure 20:
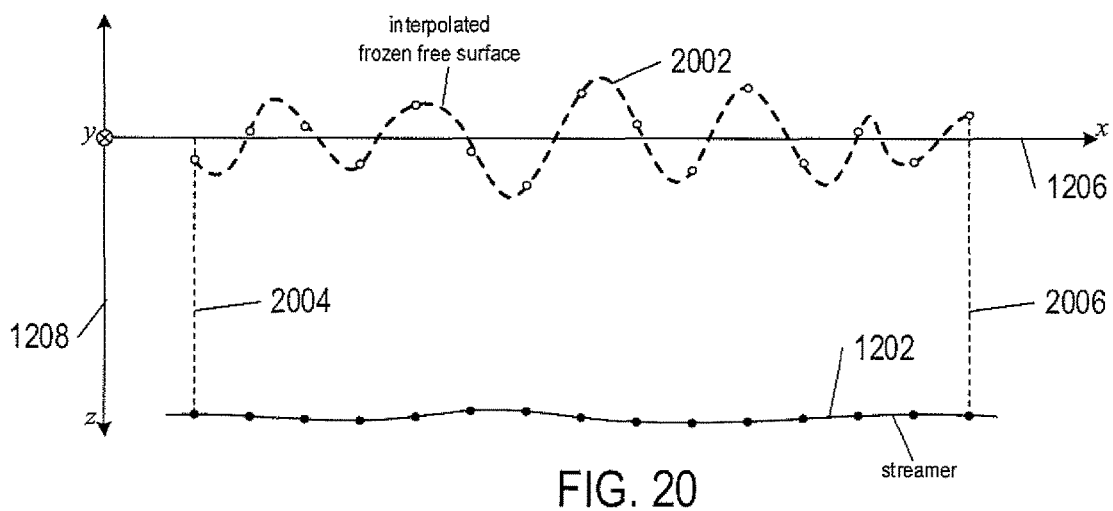
FIG. 20 shows a side-elevation view of a streamer and an approximate frozen free-surface profile.

FIG. 20 shows a side-elevation view of the streamer 1202 and an interpolated frozen-free surface represented by a dashed-line curve 2002. The interpolated frozen free surface, denoted by $f_{int}(\chi)$, approximates the side elevation view or profile of the frozen free surface 1204 shown in FIG. 12 above the streamer 1202 and between a first receiver coordinate $x_1$ and a last receiver coordinate $x_{14}$ identified respectively by dashed lines 2004 and 2006. Note that the cross-line receiver coordinate $y_r$ is suppressed, because the interpolated frozen free surface $f_{int}(\chi)$ is determined in the in-line direction above the streamer 1202. An approximate frozen free-surface profile may be composed of the interpolated frozen free surface $f_{int}(\chi)$ alone or may be composed of the interpolated frozen free surface combined with frozen free-surface extensions that approximate the frozen free surface 1204 outside the first and last receiver coordinates.

Figure 21:
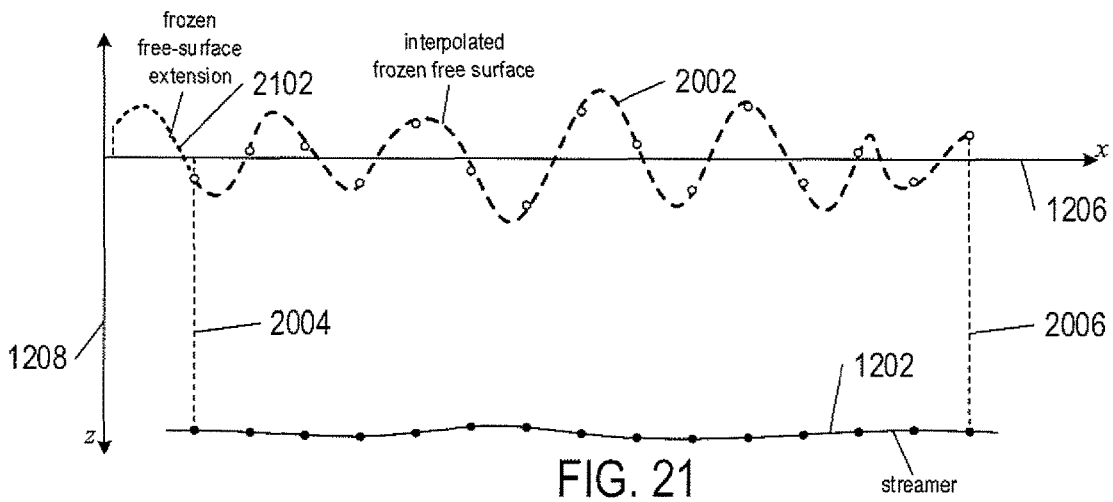
FIG. 21 shows a plot of an extended portion of the approximate frozen free-surface profile shown in FIG. 18.

FIG. 21 shows a plot of a frozen free-surface extension combined with the interpolated frozen free surface shown in FIG. 20. Dotted curve 2102 represents a frozen free-surface extension. The frozen free-surface extension 2102 may be calculated from a free-surface model based on parameters associated with the weather conditions measured at the time of the marine survey. For example, a Pierson-Moskowitz model of the free surface may be used to calculate the frozen free-surface extension 2102. The Pierson-Moskowitz model of a free surface is based on the wind blowing steadily for a long period of time over a large free-surface area to produce waves that eventually reach a state of equilibrium. This condition is referred to as a "fully developed sea." The Pierson-Moskowitz model used to calculate an extension to the approximate frozen free-surface profile at a point x in the x-direction is given by:

$$f_{ext}(x) = \frac{1}{L} \sum_{q=0}^{Q-1} F(K_q) e^{iK_q x} \qquad (35)$$

where for the integer index $q \geq 0$, $$F(K_q) = \sqrt{2\pi L W(K_q)} \begin{cases} [N(0,1) + jN(0,1)]/\sqrt{2} & \text{for } i \neq 0, Q/2 \\ N(0,1) & \text{for } i = 0, Q/2 \end{cases} \qquad (36)$$

and for $q<0$, $F(K_q)=F(K_{-q})^*$.

The parameter $W(K_q)$ is the Pierson-Moskowitz spatial roughness spectrum, which for a fully developed sea surface in one-dimension (e.g., x-direction) is given by:

$$W(K_q) = \left[\frac{\alpha}{4|K_q|^3}\right] \exp(-\beta g^2 / K_q^2 U_w^4) \qquad (37)$$

where $K_q$ is the spatial wavenumber;

$U_w$ is the wind speed measured at a height of about 19 meters;

$\alpha$ is $8.0 \times 10^{-3}$;

$\beta$ is 0.74; and g is the acceleration due to gravity.

In Equations (36) and (37), the spatial wavenumber for component q is given by $K_q = 2\pi q/L$, where L is the length of free surface. The random number N(0,1) may be generated from a Gaussian distribution having zero mean and a unit variance. As a result, the free surface is formed by adding each wavenumber component imposing random phase shifts. A frozen-in-time Pierson-Moskowitz free surface may be computed from Equation (36) using a FFT for computational efficiency.

The frozen free-surface extension $f_{ext}(\chi)$ may be combined with the approximate frozen free-surface profile $f_{int}(x\chi)$ to form an approximate frozen free-surface profile given by $$f(x) = \begin{cases} f_{ext}(x) & \text{for } x \text{ outside first and last receivers} \\ f_{int}(x) & \text{for } x \text{ between first and last } receiers \end{cases} \quad (38)$$

In alternative implementations, the approximate frozen free-surface extension may be expanded to include a time parameter that characterizes the frozen free surface at different times. Free-surface waves are generally dispersive and in deep water, and the frequency and wavenumber are related by a dispersion relation given by:

$$\Omega(K_q) = \sqrt{gK_q} \quad (39)$$

Equation (39) implies that each spatial harmonic component of the free-surface wavefield may move with a definite phase velocity. As a result, in general, free-surface waves of longer wavelengths travel faster relative to waves with shorter wavelengths. Combining Equations (36) and (39) gives a time-varying frozen free surface:

$$f_{ext}(x, t) = \frac{1}{L}\sum_{q=0}^{Q-1} F(K_q)e^{i(K_q x - \Omega(K_q)t)} \quad (40)$$

where t is instantaneous time.

Equation (40) characterizes a one-dimensional rough free surface moving in the positive x-direction and may be used to compute the frozen free-surface extension 2102 at earlier or later times.

Consider a free-surface shape at an instant in time t with wave heights given by Equation (40). The wavenumber spectrum $F(K_q)$ of the free surface is computed according to Equation (36) and an arbitrary known dispersion relation $\Omega(K_q)$ is calculated according to Equation (39) may be used to calculate the frozen free surface at an earlier (t−Δt) or a later (t+Δt) time by:

$$f_{ext}(x, t) = \frac{1}{L}\sum_{q=0}^{Q-1} F(K_q)e^{i(K_q x - \Omega(K_q)\Delta t)} \quad (41)$$

Figure 22:
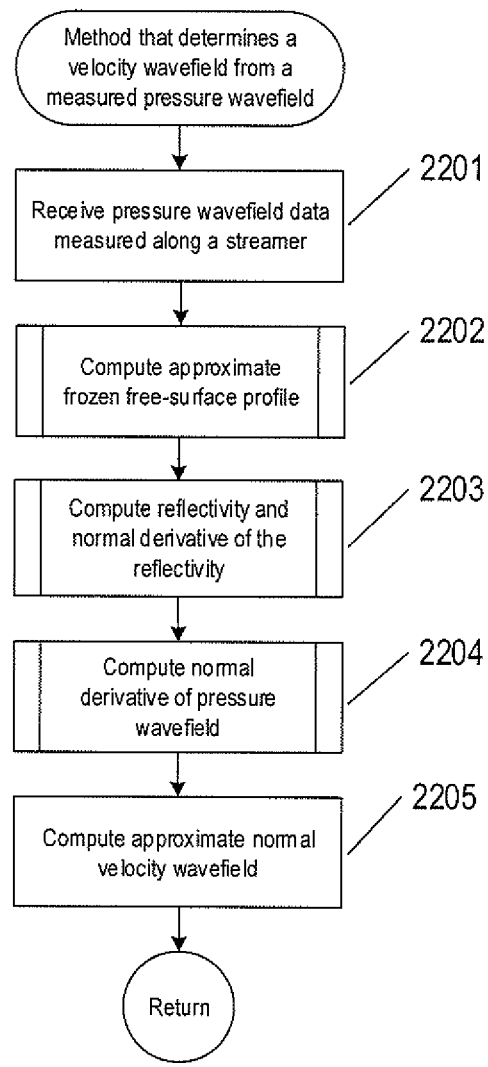
FIG. 22 shows a flow-control diagram of a method of determining a velocity wavefield.

FIG. 22 shows a flow diagram of a method of determining a velocity wavefield. In block 2201, pressure data generated by pressure sensors located at receiver locations a streamer is received, as described above with reference to FIGS. 1-2. The pressure data represents a measured pressure wavefield. For example, the pressure wavefield may result from activating a source above a subterranean formation, as described above with reference to FIG. 3. In block 2202, a routine "compute approximate frozen free-surface profile" is called to compute an approximate shape or profile of the frozen free surface above the streamer at the time the pressure wavefield was measured based on the pressure data alone. In block 2203, a routine "compute reflectivity and normal derivative of reflectivity" is called to compute the reflectivity and normal derivative of the reflectivity at the receiver locations. In block 2204, a routine "compute normal derivative of pressure wavefield" is called to compute normal derivatives of the pressure at receiver locations of the streamer based on the reflectivity and normal derivative of the reflectivity of the approximate frozen free surface computed in block 2203. In block 2205, approximate normal-velocity wavefield is computed at receiver locations based on the normal derivate of the pressure wavefield computed in block 2204 according to Equation (19).

Figure 23:
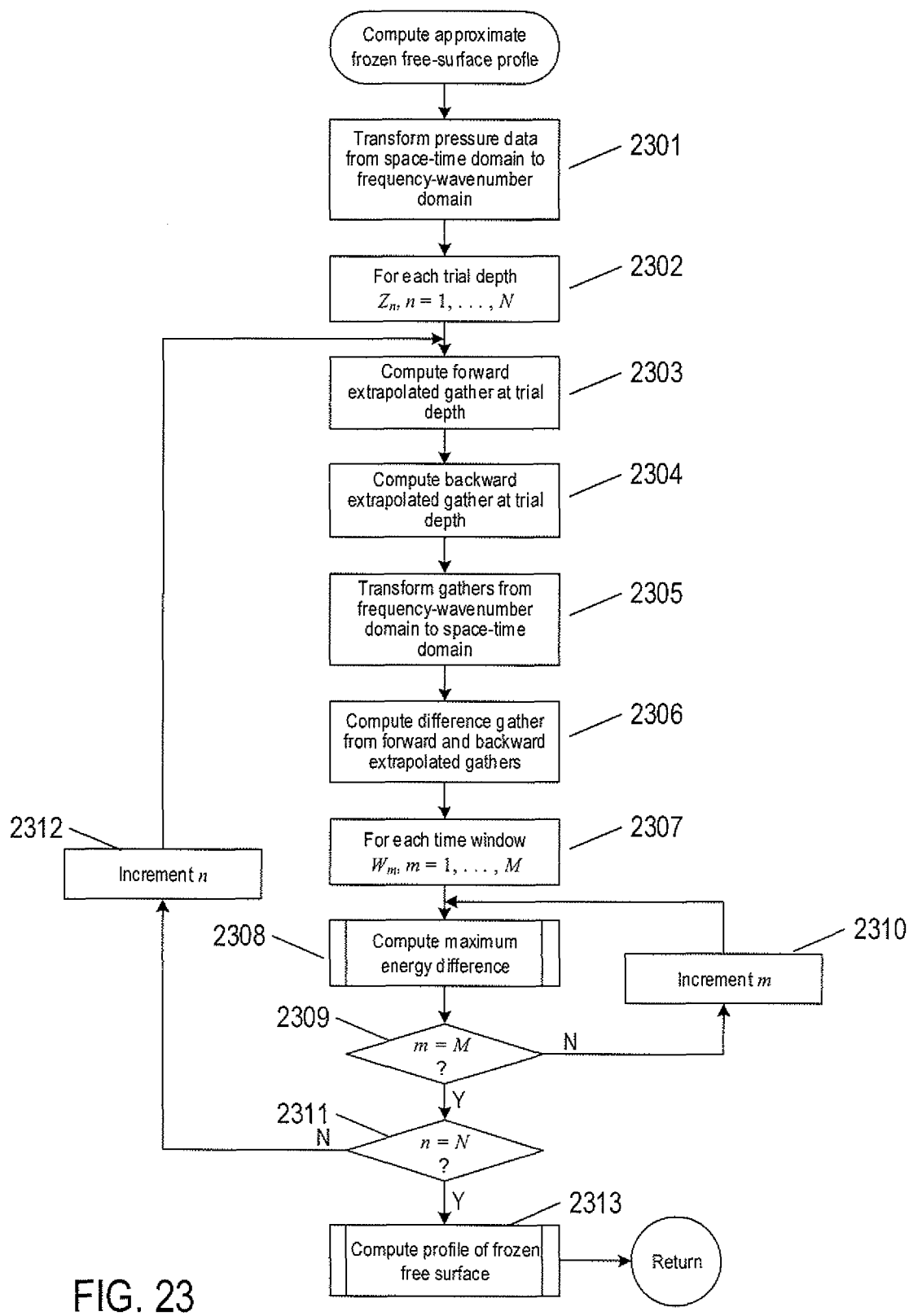
FIG. 23 shows a flow diagram of the routine "compute approximate frozen free-surface profile" called in FIG. 22.

FIG. 23 shows a flow-control diagram of the routine "compute approximate frozen free-surface profile" called in block 2202 of FIG. 22. In block 2301, the pressure data may be transformed from the s-t domain to the k-f domain. A for-loop beginning with block 2302 repeats the computational operations represented by blocks 2303-2312 for N trial depths. In block 2303, a forward extrapolated gather is computed for a trial depth $Z_n$, as described above with reference to Equation (26). In block 2304, a backward extrapolated gather is computed for a trial depth $Z_n$, as described above with reference to Equation (27). In block 2305, the forward and backward extrapolated gathers are transformed from k-f domain back to the s-t domain as described above with reference to Equation (28) using an IFFT or a IDFT to obtain forward and backward extrapolated gathers in the s-t domain. In block 2306, a difference gather is computed from the forward and back extrapolated gathers as described above with reference to Equation (30) and with reference to FIG. 15. A for-loop beginning with block 2307 repeats the computational operations represented by blocks 2308-2310 for a series of time windows as described above with reference to FIGS. 17A-17C. In block 2308, a routine "compute maximum energy difference" is called as described below with reference to FIG. 24. In decision block 2309, when window index in equals the number M of windows in the time window series, control flows to decision block 2311. Otherwise, control flows to block 2310 in which the window index is incremented and the operation represented by block 2308 is repeated. In decision block 2311, when trial depth index n equals the number N of trial depth in the series of trial depths, control flows to block 2313. Otherwise, the method increments the trial depth index n in block 2312 and repeats the operations represented by blocks 2303-2311 for a different trial depth. In block 2313, a routine "compute profile of frozen free surface" is called as described below with reference to FIG. 26.

Figure 24:
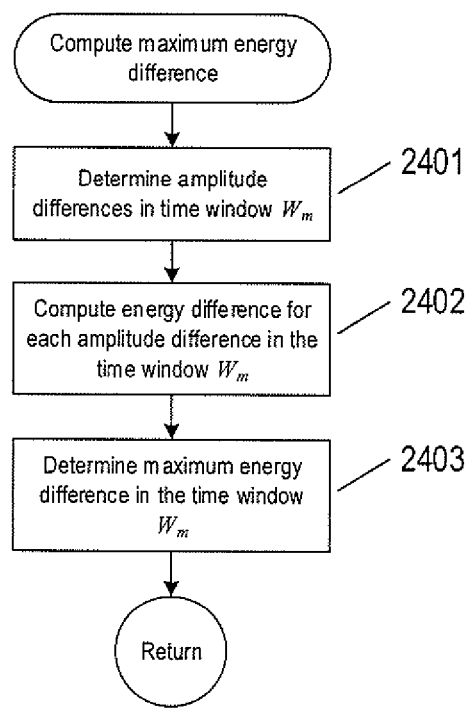
FIG. 24 shows a flow-control diagram of a routine "compute maximum energy difference" called in FIG. 23.

FIG. 24 shows a flow-control diagram of the routine "compute maximum energy difference" called in block 2308 of FIG. 23. In block 2401, amplitude differences in a time window $W_m$ are determined. In block 2402, energy differences are computed for each amplitude difference in the time window $W_m$, as described above with reference to Equation (31) and FIG. 17B. In block 2403, a maximum energy difference for the time window $W_m$ is determined, as described above with reference to Equation (32).

Figure 25:
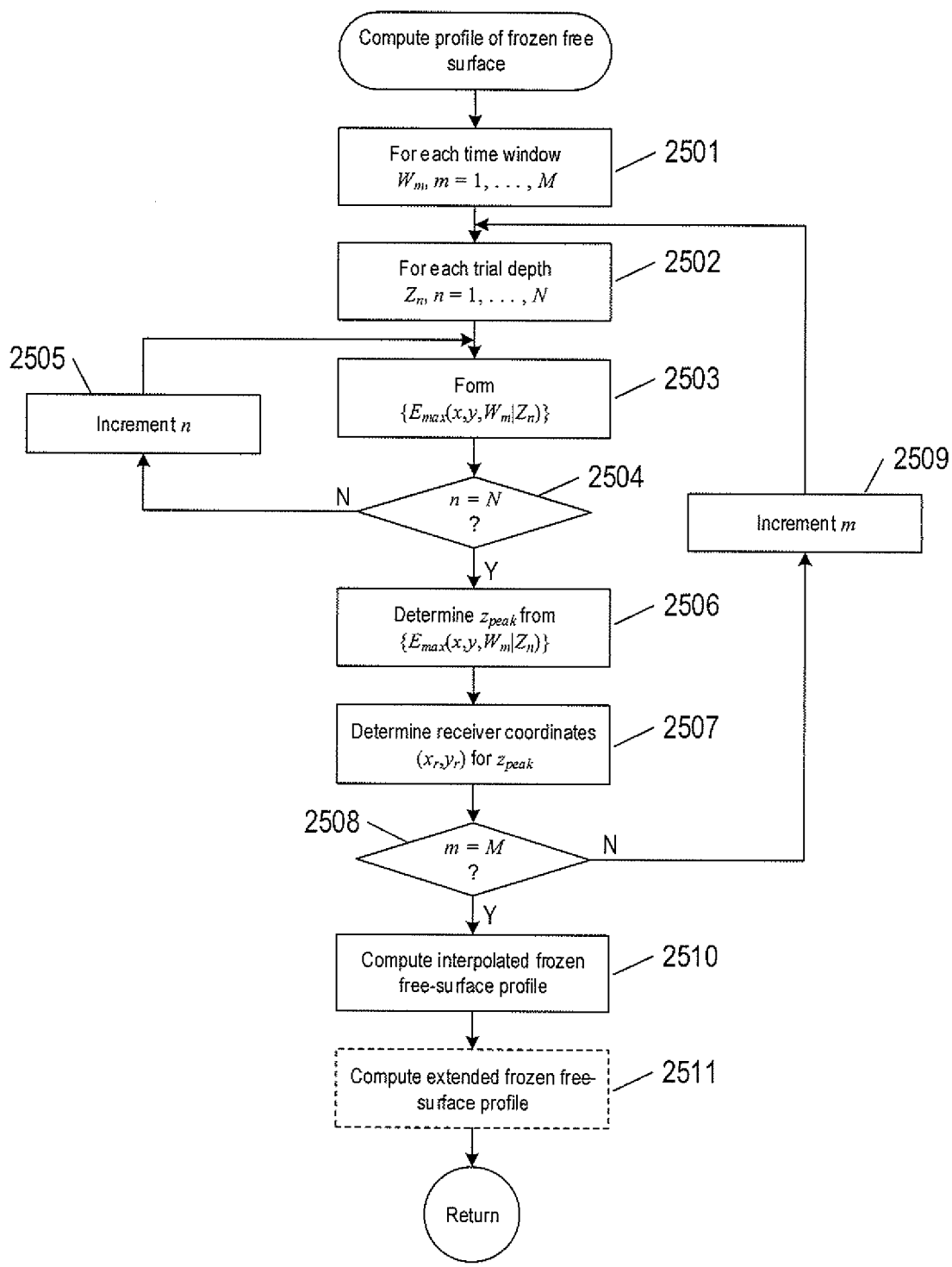
FIG. 25 shows a flow-control diagram of the routine "compute profile of frozen free surface" called in FIG. 24.

FIG. 25 shows a flow-control diagram of the routine "compute profile of a frozen free surface" called in block 2313 of FIG. 23. A for-loop beginning with block 2501 repeats the computational operations represented by blocks 2502-2509 for each time window. A for-loop beginning with block 2502 repeats the computational operations represented by blocks 2503-2505 for each trial depth. In block 2503, a set of maximum energy differences is formed as described above with reference to FIG. 18. In decision block 2504, when the trial depth index n does not equal the number of trial depths N, control flows to block 2505 in which the trial depth index is incremented and the operation represented by block 2503 is repeated. Otherwise, control flows to block 2506 and a peak trial depth is determined as described above with reference to Equation (34). In block 2507, receiver coordinates associated with the peak trial depth are determined as described above with reference to FIG. 18. In decision block 2508, when the time window index m does not equal the number of time windows M in the time window series, control flows to block 2509 in which the time window index is incremented and the operations represented by blocks 2502-2508 are repeated. In block 2510, an interpolated frozen free-surface profile is computed as described above with reference to FIG. 20. In block 2511, a frozen free-surface extension may be computed as described above with reference to FIG. 21 and Equations (35)-(41).

Figure 26:
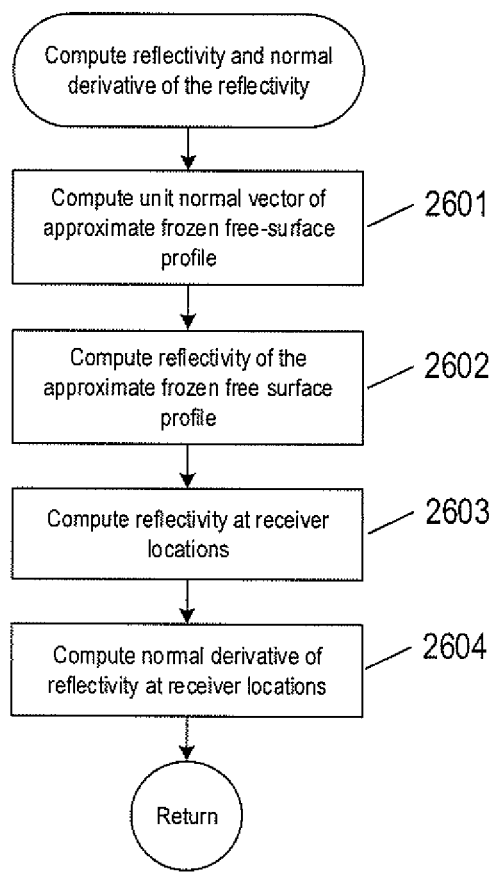
FIG. 26 shows a flow-control diagram of the routine "compute reflectivity and normal derivative of reflectivity" called in FIG. 22.

FIG. 26 shows a flow diagram of the routine "compute reflectivity and normal derivative of the reflectivity" called in block 2203 of FIG. 22. In block 2601, unit normal vectors are computed for free-surface points as described above with reference to FIGS. 11A-11B. In block 2602, reflectivity is computed using the Green's function computed as described above with reference to Equation (24a) and based on the unit normal vectors at free-surface points. In block 2603, reflectivity at receiver locations are computed using the Green's function of Equation (24b). In block 2604, normal derivatives of the reflectivity at receiver locations, as described above with reference to Equation (24c).

Figure 27:
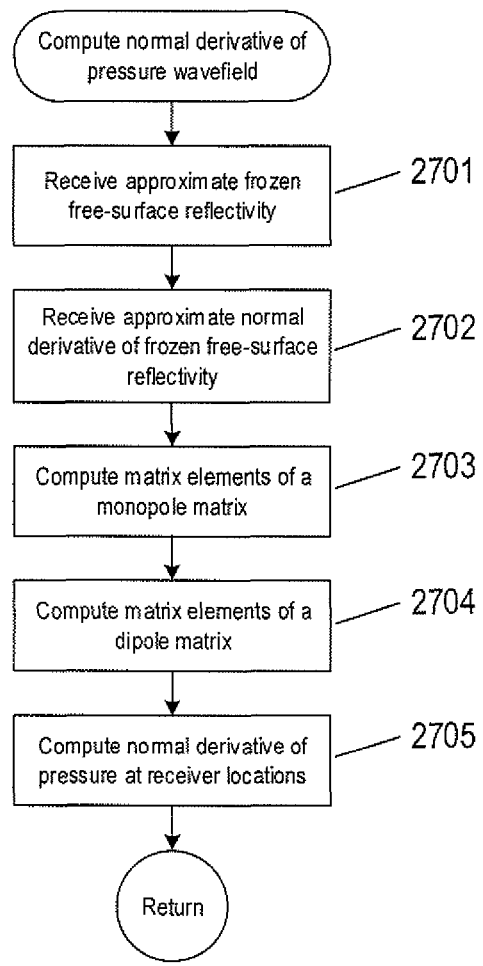
FIG. 27 shows a flow-control diagram of the routine "compute normal derivative of pressure wavefield" called in FIG. 22.

FIG. 27 shows a flow-control diagram of the routine "compute normal derivative of pressure wavefield" called in block 2203 of FIG. 22. In block 2701, the reflectivity of the approximate frozen free-surface profile computed in block 2603 of FIG. 26 is received. In block 2702, an approximate normal derivate of the reflectivity (i.e., Green's function) computed in block 2603 of FIG. 23 is received. In block 2703, matrix elements $M_{qk}$ of a monopole matrix are computed as described above with reference to Equations (15), (17a), and (24b). In block 2704, matrix elements $D_{qk}$ of a dipole matrix are computed as described above with reference to Equations (15), (17b), and (24c). In block 2705, normal derivative of the pressure wavefield at receiver coordinates along the streamer are computed as described above with reference to Equation (18).

FIG. 28 shows a flow diagram of a method of computing a combined vertical-velocity wavefield. In FIG. 28, blocks 2801-2805 correspond to blocks 2201-2205 described above with reference to FIG. 22. In block 2806, approximate vertical-velocity wavefield is computed as described above with reference to Equations (20) and (21). In block 2807, combined vertical-velocity wavefield is computed as described above with reference to Equation (6).

FIG. 29 shows a flow diagram of a method of wavefield separation. In FIG. 29, blocks 2901-2905 correspond to blocks 2201-2205 described above with reference to FIG. 22. In block 2906, approximate vertical-velocity wavefield is computed as described above with reference to Equations (20) and (21). In block 2907, an up-going pressure or vertical-velocity wavefield is computed as described above with reference to Equations (10a)-(10b).

The mathematical equations and formulas presented above are not, in any way, intended to mean or suggest an abstract idea or concept. Instead the mathematical equations described above provide a concise conceptual representation computational operations that may performed seismic data. The mathematical equations and methods described above are ultimately implemented on physical computer hardware, data-storage devices, and communications systems in order to obtain results that also represent physical properties, materials, and deposits within the earth's interior. For example, as explained above, a pressure wavefield emanating from an actual subterranean formation after being illuminated with an acoustic signal is composed of actual physical pressure waves that are sampled using physical and concrete pressure sensors. The pressure sensors in turn produce physical electrical or optical signals that encode pressure data that is recorded on physical data-storage devices and undergoes computational processing using hardware as describe above to compute an approximate vertical-velocity wavefield that may in turn be used to compute up-going wavefield data that represents physical and concrete up-going pressure and vertical-velocity wavefields. The approximate vertical-velocity wavefield or the up-going wavefield data may be displayed, or subjected to further seismic data processing, in order to interpret the physical structure and composition of the subterranean formation, such as in monitoring production of an actual hydrocarbon deposit within the subterranean formation.

Figure 30:
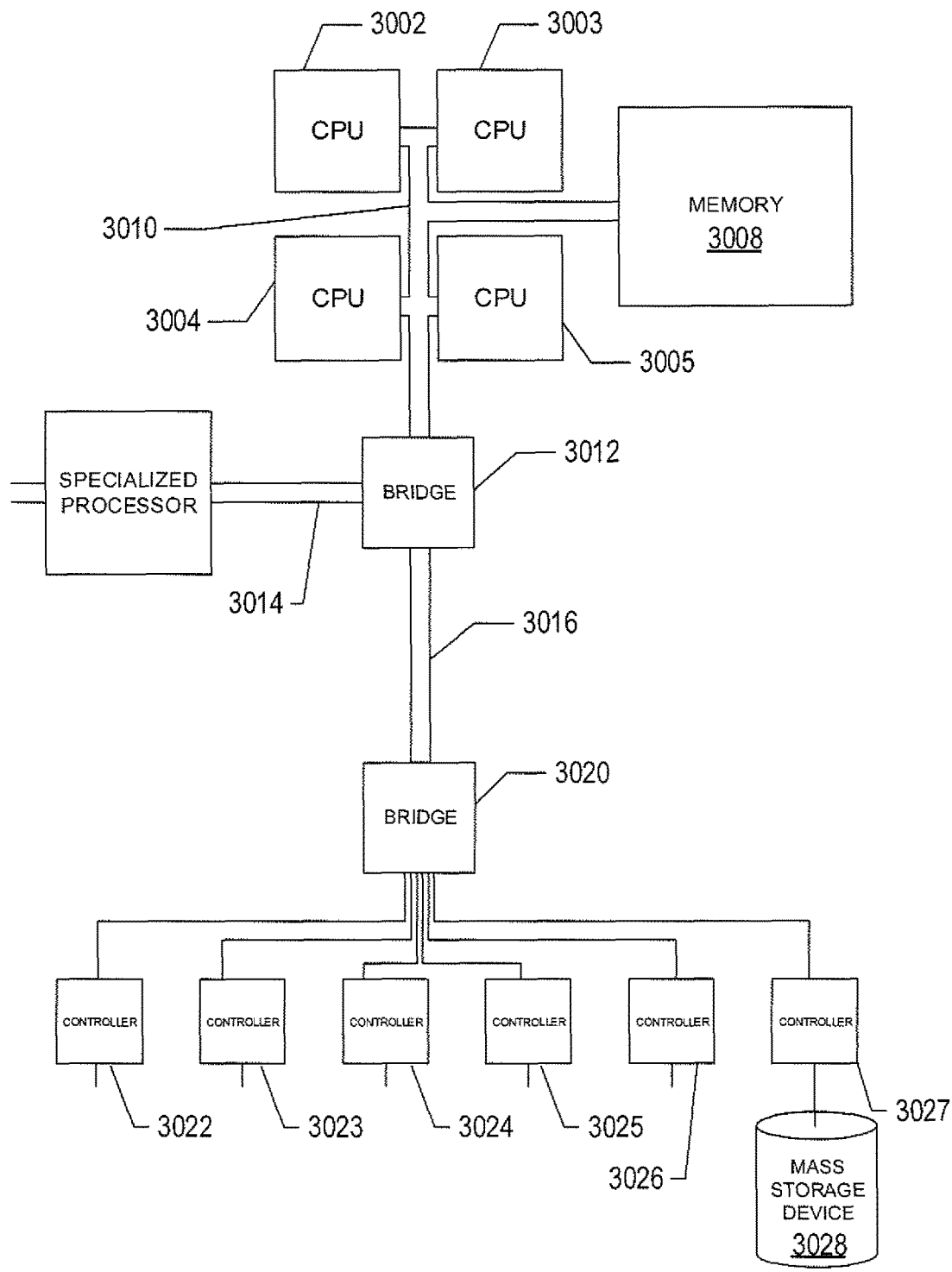
FIG. 30 shows an example of a computer system programmed to execute efficient methods of computing approximate vertical-velocity wavefields.

FIG. 30 shows an example of a computer system programmed to execute efficient methods of computing approximate vertical-velocity wavefields based on measured pressure wavefields and therefore represents a geophysical-analysis data-processing system. The internal components of many small, mid-sized, and large computer systems as well as specialized processor-based storage systems may be described with respect to this generalized architecture, although each particular system may feature many additional components, subsystems, and similar, parallel systems with architectures similar to this generalized architecture. The computer system contains one or multiple central processing units ("CPUs") 3002-3005, one or more electronic memories 3008 interconnected with the CPUs by a CPU/memory-subsystem bus 3010 or multiple busses, a first bridge 3012 that interconnects the CPU/memory-subsystem bus 3010 with additional busses 3014 and 3016, or other types of high-speed interconnection media, including multiple, high-speed serial interconnects. The busses or serial interconnections, in turn, connect the CPUs and memory with specialized processors, such as a graphics processor 3018, and with one or more additional bridges 3020, which are interconnected with high-speed serial links or with multiple controllers 3022-3027, such as controller 3027, that provide access to various different types of computer-readable media, such as computer-readable medium 3028, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 3028 is non-transitory and be a data-storage device, including electronic memory, optical or magnetic disk drive, USB drive, flash memory and other such data-storage device. The computer-readable medium 3028 can be used to store machine-readable instructions that encode the computational methods described above and can be used to store encoded data, during store operations, and from which encoded data can be retrieved, during read operations, by computer systems, data-storage systems, and peripheral devices.

Figure 31A:
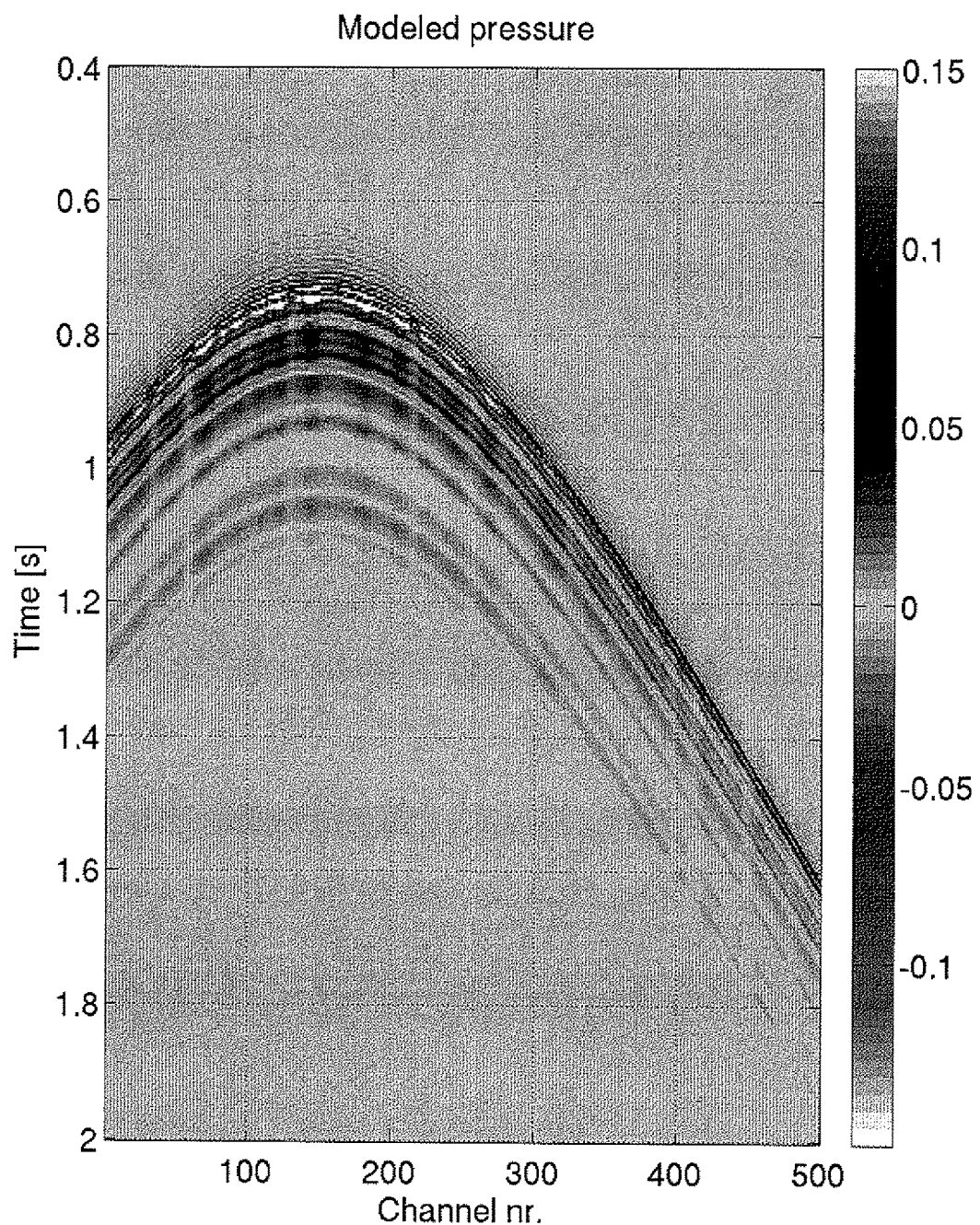
FIGS. 31A-31D show simulation results in computing a normal derivative of a pressure wavefield.
Figure 31B:
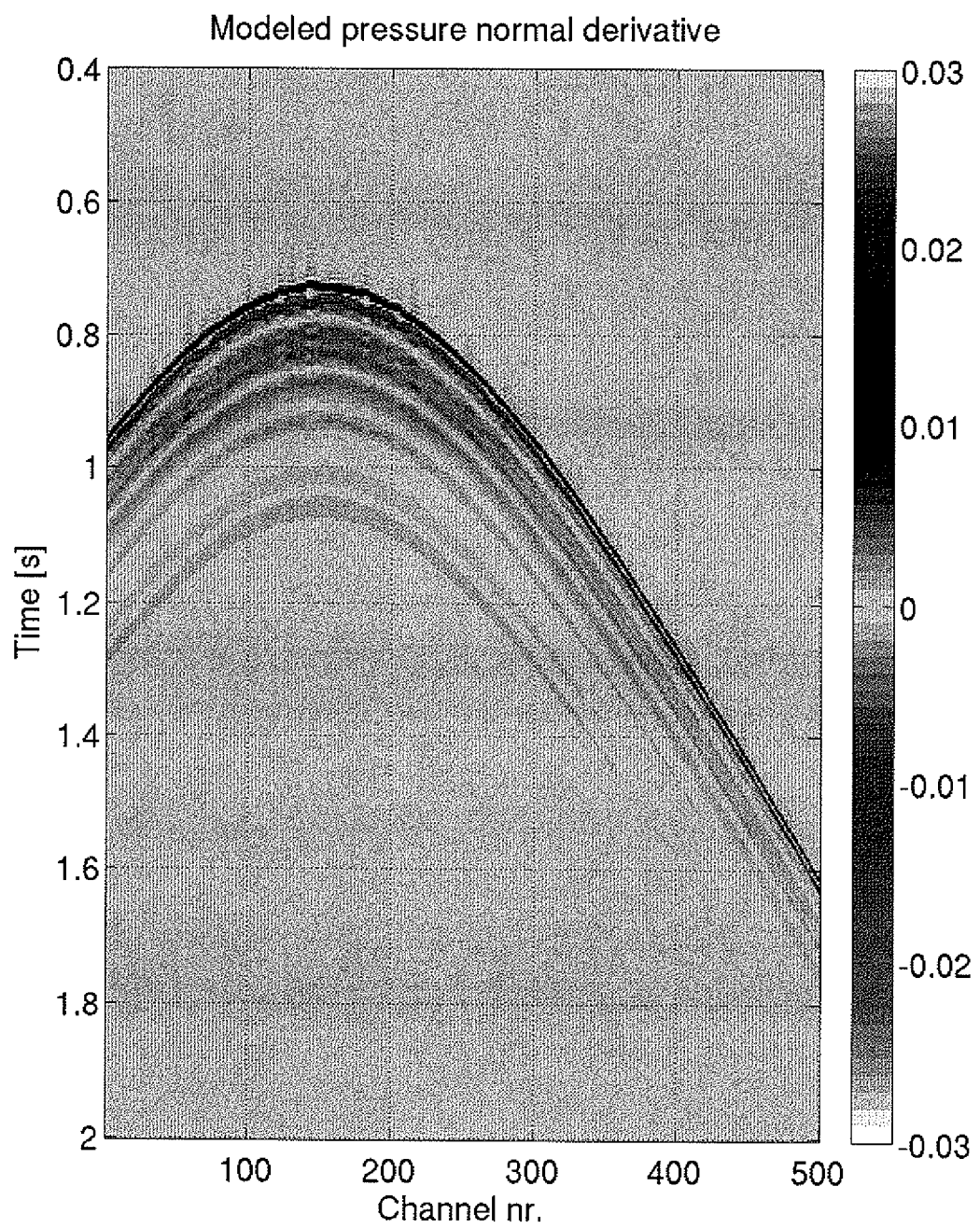
Figure 31C:
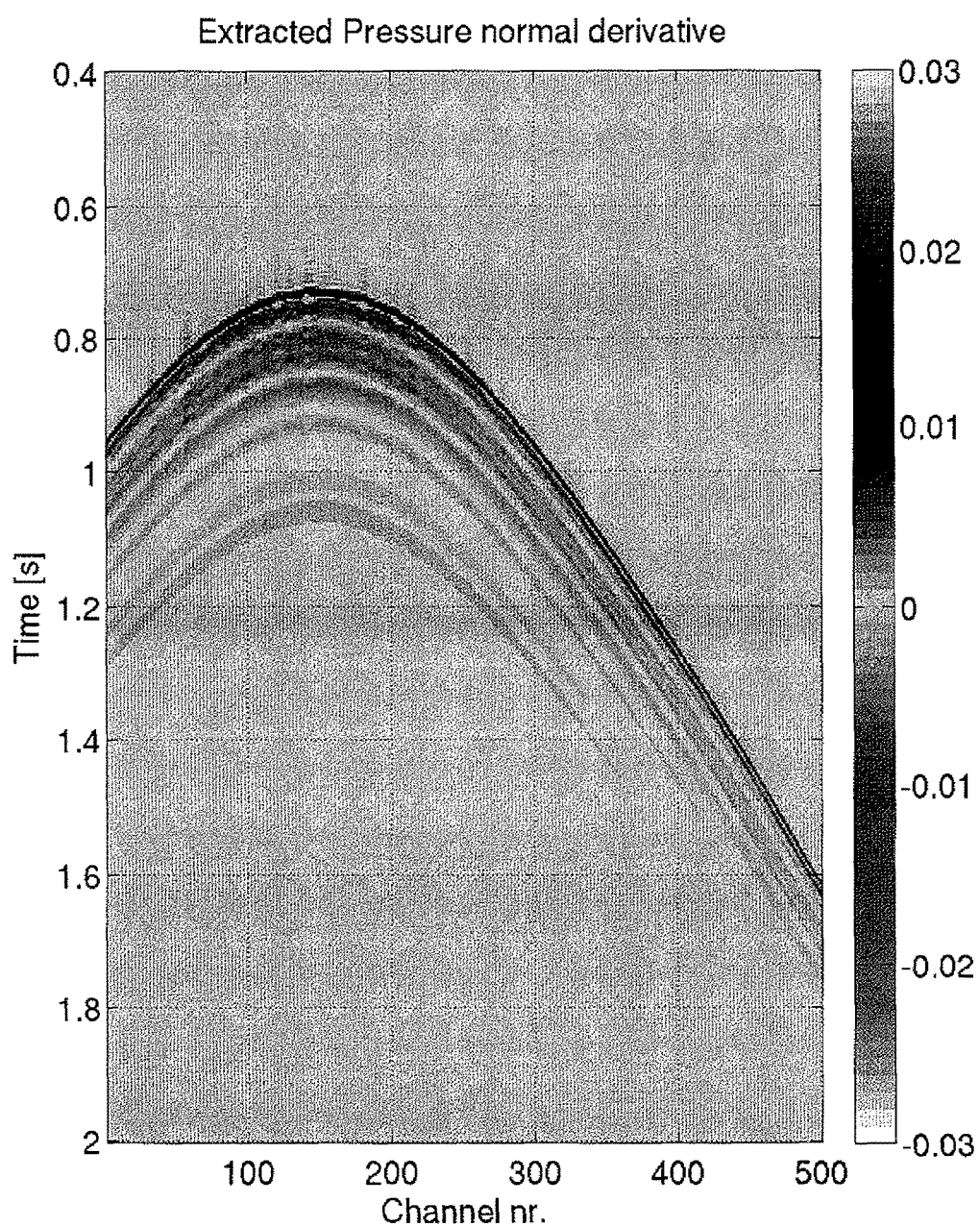
Figure 31D:
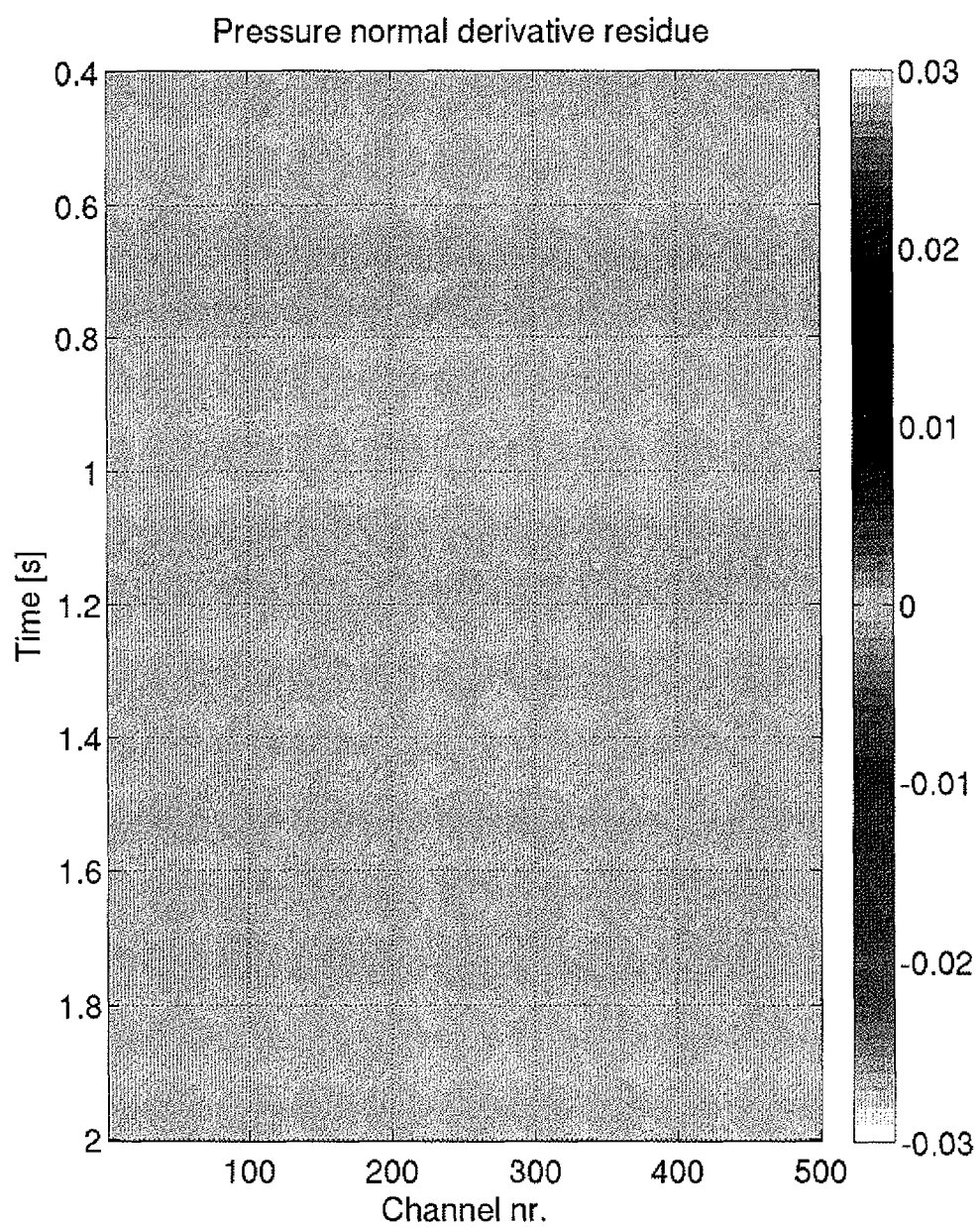

FIGS. 31A-31D show simulation results in computing a normal derivative of a pressure wavefield. In FIGS. 31A-31D, horizontal axes represent channel (i.e., trace) numbers and vertical axes represent time. FIG. 31A shows a modeled pressure wavefield. FIG. 31B shows a modeled normal derivative of the pressure wavefield shown in FIG. 31B. The modeled normal derivative of the pressure wavefield was computed from the modeled pressured wavefield shown in FIG. 31A. FIG. 31C shows a normal derivative of the pressure wavefield shown in FIG. 31A computed as described above with reference to method shown in FIG. 22. FIG. 31D shows the difference between the modeled normal derivative of the pressure wavefield shown in FIG. 31B and the modeled normal derivative of the pressure wavefield shown in FIG. 22.

Although the above disclosure has been described in terms of particular implementations, it is not intended that the disclosure be limited to these implementations. Modifications within the spirit of this disclosure will be apparent to those skilled in the art. For example, any of a variety of different implementations may be obtained by varying any of many different design and development parameters, including programming language, underlying operating system, modular organization, control structures, data structures, and other such design and development parameters.

The method described above may be implemented in real time while a marine survey is being conducted or subsequent to completion of the marine survey. The measured pressure wavefield and approximate normal-velocity wavefield may form geophysical data products indicative of certain properties of a subterranean formation. The geophysical data products may include processed seismic data and may be stored on a computer-readable medium as described above. The geophysical data products may be produced offshore (i.e. by equipment on the survey vessel 102) or onshore (i.e. at a computing facility on land) either within the United States or in another country. When the geophysical data product is produced offshore or in another country, it may be imported onshore to a data-storage facility in the United States. Once onshore in the United States, geophysical analysis may be performed on the data product.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. In a process for generating an image of a subterranean formation using marine seismic techniques in which one or more sources are activated to generate acoustic energy that is reflected from the subterranean formation and recorded as pressure data by pressure sensors located in one or more streamers, the specific improvement comprising:
    computing an approximate frozen free-surface profile of a free surface above a streamer based on pressure data generated by pressure sensors located at receiver locations along the streamer, the pressure data represents the measured pressure wavefield;
    computing reflectivity and normal derivative of the reflectivity at the receiver locations based on the approximate frozen free-surface profile;
    computing a normal derivative of the measured pressure wavefield at the receiver locations based on the reflectivity and the normal derivative of the reflectivity at the receiver locations;
    computing an approximate normal-velocity wavefield at the receiver locations along the streamer based on the normal derivative of the measured pressure wavefield at the receiver locations, the approximate normal-velocity wavefield does not include low-frequency, streamer vibrational noise; and
    generating an image of the subterranean formation based at least in part on the measured pressure wavefield and the approximate normal-velocity wavefield.

2. The process of claim 1, wherein computing the approximate frozen free-surface profile further comprises:
    transforming pressure data from space-time domain to frequency-wavenumber domain;
    for each trial depth of a series of trial depths,
        computing forward and backward extrapolated gathers based on the pressure data,
        transforming forward and backward extrapolated gathers from the frequency-wavenumber domain to the space-time domain;
        computing a difference gather from forward and backward extrapolated gathers;
        computing a set of maximum energy differences for a series of time windows applied to the difference gather; and
    computing a profile of the approximate frozen free surface.

3. The process of claim 2, wherein computing the set of maximum energy differences for the series of time windows further comprises:
    for each time window,
        determining amplitude differences in the time window;
        computing energy difference for each amplitude difference in the time window; and
        determining a maximum energy differences from the energy differences in the time window.

4. The process of claim 2, wherein computing the profile of the approximate frozen free surface further comprises:
    for each time window and for each trial depth, determining peak coordinates associated maximum energy difference in each of set of maximum energy differences;
    determining receiver in-line and cross-line coordinates of receiver locations associated with the peak coordinates; and
    computing interpolated frozen free-surface profile based on peak coordinates and associated in-line and cross-line coordinates, the interpolated frozen free-surface profile is the approximate frozen free-surface profile.

5. The process of claim 4, further comprising extending the approximate frozen free-surface profile beyond first and last receiver locations of the streamer.

6. The process of claim 1, wherein computing the reflectivity and normal derivative of reflectivity further comprises:
    computing a unit normal vector of the approximate frozen free-surface profile;
    computing reflectivity of the approximate frozen free-surface profile based on the unit normal vector at points along the approximate frozen free-surface profile;
    computing reflectivity at the receiver coordinates based on the reflectivity of the approximate frozen free-surface profile; and
    computing normal derivative of the reflectivity at the receiver coordinates.

7. The process of claim 1, wherein computing a normal derivative of the pressure wavefield at receiver locations further comprises:
    compute elements of a monopole matrix based on the reflectivity;
    compute elements of a dipole matrix based on the normal derivative of the reflectivity; and
    compute derivative of the pressure wavefield at the receiver locations based on the monopole matrix and the dipole matrix.

8. The process of claim 1, further comprising computing an approximate vertical-velocity wavefield at receiver locations based on the normal-velocity wavefield at receiver locations and orientation of the receivers.

9. The process of claim 8, further comprising computing a combined vertical-velocity wavefield composed of the approximate vertical-velocity wavefield over a low-frequency range and a measured vertical-velocity wavefield for frequencies outside the low-frequency range.

10. The process of claim 8, further comprising computing an up-going pressure wavefield based on the approximate vertical-velocity wavefield and the measured pressure wavefield.

11. The process of claim 1, wherein the approximate normal-velocity wavefield and measured pressure wavefield are geophysical data products, further comprising recording the geophysical data product on a physical, non-volatile computer-readable medium suitable for importing onshore.

12. The process of claim 10, further comprising performing geophysical analysis onshore on the geophysical data product.

13. The process of claim 1, further comprising the measured pressure wavefield generated by one or more receivers located along the streamer.

14. A computer system for generating an image of a subterranean formation, the system comprising:
one or more processors;
one or more data-storage devices; and
machine-readable instructions stored in one or more of data-storage devices and executed by the one or more processors, the machine-readable instructions directed to
computing an approximate frozen free-surface profile of a free surface above a streamer based on pressure data generated by pressure sensors located at receiver locations along the streamer, the pressure data represents the measured pressure wavefield;
computing reflectivity and normal derivative of the reflectivity at the receiver locations based on the approximate frozen free-surface profile;
computing a normal derivative of the measured pressure wavefield at the receiver locations based on the reflectivity and the normal derivative of the reflectivity at the receiver locations;
computing an approximate normal-velocity wavefield at the receiver locations along the streamer based on the normal derivative of the measured pressure wavefield at the receiver locations, the approximate normal-velocity wavefield does not include low-frequency streamer vibrational noise; and
generating an image of the subterranean formation based at least in part on the measured pressure wavefield and the approximate normal-velocity wavefield.

15. The system of claim 14, wherein computing the approximate frozen free-surface profile further comprises:
transforming pressure data from space-time domain to frequency-wavenumber domain;
for each trial depth of a series of trial depths,
computing forward and backward extrapolated gathers based on the pressure data,
transforming forward and backward extrapolated gathers from the frequency-wavenumber domain to the space-time domain;
computing a difference gather from forward and backward extrapolated gathers;
computing a set of maximum energy differences for a series of time windows applied to the difference gather; and
computing a profile of the approximate frozen free surface.

16. The system of claim 15, wherein computing the set of maximum energy differences for the series of time windows further comprises:
for each time window,
determining amplitude differences in the time window;
computing energy difference for each amplitude difference in the time window; and
determining a maximum energy differences from the energy differences in the time window.

17. The system of claim 15, wherein computing the profile of the approximate frozen free surface further comprises:
for each time window and for each trial depth, determining peak coordinates associated maximum energy difference in each of set of maximum energy differences;
determining receiver in-line and cross-line coordinates of receiver locations associated with the peak coordinates; and
computing interpolated frozen free-surface profile based on peak coordinates and associated in-line and cross-line coordinates, the interpolated frozen free-surface profile is the approximate frozen free-surface profile.

18. The system of claim 17, further comprising extending the approximate frozen free-surface profile beyond first and last receiver locations of the streamer.

19. The system of claim 14, wherein computing the reflectivity and normal derivative of reflectivity further comprises:
computing a unit normal vector of the approximate frozen free-surface profile;
computing reflectivity of the approximate frozen free-surface profile based on the unit normal vector at points along the approximate frozen free-surface profile;
computing reflectivity at the receiver coordinates based on the reflectivity of the approximate frozen free-surface profile; and
computing normal derivative of the reflectivity at the receiver coordinates.

20. The system of claim 14, wherein computing a normal derivative of the pressure wavefield at receiver locations further comprises:
compute elements of a monopole matrix based on the reflectivity;
compute elements of a dipole matrix based on the normal derivative of the reflectivity; and
compute derivative of the pressure wavefield at the receiver locations based on the monopole matrix and the dipole matrix.

21. The system of claim 14, further comprising computing an approximate vertical-velocity wavefield at receiver locations based on the normal-velocity wavefield at receiver locations and orientation of the receivers.

22. A non-transitory computer-readable medium having machine-readable instructions encoded thereon for generating an image of a subterranean formation and enabling one or more processors of a computer system to perform the operations of
computing an approximate frozen free-surface profile of a free surface above a streamer based on pressure data generated by pressure sensors located at receiver locations along the streamer, the pressure data represents the measured pressure wavefield;
computing reflectivity and normal derivative of the reflectivity at the receiver locations based on the approximate frozen free-surface profile;

computing a normal derivative of the measured pressure wavefield at the receiver locations based on the reflectivity and the normal derivative of the reflectivity at the receiver locations;

computing an approximate normal-velocity wavefield at the receiver locations along the streamer based on the normal derivative of the measured pressure wavefield at the receiver locations, the approximate normal-velocity wavefield does not include low-frequency, streamer vibrational noise; and generating an image of the subterranean formation based at least in part on the measured pressure wavefield and the approximate normal-velocity wavefield.

23. The medium of claim 22, wherein computing the approximate frozen free-surface profile further comprises:

transforming pressure data from space-time domain to frequency-wavenumber domain;

for each trial depth of a series of trial depths,
computing forward and backward extrapolated gathers based on the pressure data,
transforming forward and backward extrapolated gathers from the frequency-wavenumber domain to the space-time domain;
computing a difference gather from forward and backward extrapolated gathers;
computing a set of maximum energy differences for a series of time windows applied to the difference gather; and computing a profile of the approximate frozen free surface.

24. The medium of claim 23, wherein computing the set of maximum energy differences for the series of time windows further comprises:

for each time window,
determining amplitude differences in the time window;
computing energy difference for each amplitude difference in the time window; and
determining a maximum energy differences from the energy differences in the time window.

25. The medium of claim 23, wherein computing the profile of the approximate frozen free surface further comprises:

for each time window and for each trial depth, determining peak coordinates associated maximum energy difference in each of set of maximum energy differences;

determining receiver in-line and cross-line coordinates of receiver locations associated with the peak coordinates; and compute interpolated frozen free-surface profile based on peak coordinates and associated in-line and cross-line coordinates, the interpolated frozen free-surface profile is the approximate frozen free-surface profile.

26. The medium of claim 25, further comprising extending the approximate frozen free-surface profile beyond first and last receiver locations of the streamer.

27. The medium of claim 22, wherein computing the reflectivity and normal derivative of the reflectivity further comprises:

computing a unit normal vector of the approximate frozen free-surface profile;

computing reflectivity of the approximate frozen free-surface profile based on the unit normal vector at points along the approximate frozen free-surface profile;

computing reflectivity at the receiver coordinates based on the reflectivity of the approximate frozen free-surface profile; and computing normal derivative of the reflectivity at the receiver coordinates.

28. The medium of claim 21, wherein computing a normal derivative of the pressure wavefield at receiver locations further comprises:

compute elements of a monopole matrix based on the reflectivity;

compute elements of a dipole matrix based on the normal derivative of the reflectivity; and compute derivative of the pressure wavefield at the receiver locations based on the monopole matrix and the dipole matrix.

29. The medium of claim 22, further comprising computing an approximate vertical-velocity wavefield at receiver locations based on the normal-velocity wavefield at receiver locations and orientation of the receivers.

* * * * *